(12) United States Patent
Christie et al.

(10) Patent No.: US 11,112,956 B2
(45) Date of Patent: Sep. 7, 2021

(54) DEVICE, METHOD, AND GRAPHICAL USER INTERFACE FOR SWITCHING BETWEEN CAMERA INTERFACES

(71) Applicant: Apple Inc., Cupertino, CA (US)

(72) Inventors: Gregory N. Christie, San Jose, CA (US); Imran Chaudhri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/230,780

(22) Filed: Dec. 21, 2018

(65) Prior Publication Data

US 2019/0121530 A1 Apr. 25, 2019

Related U.S. Application Data

(63) Continuation of application No. 14/290,922, filed on May 29, 2014, now Pat. No. 10,168,882.

(Continued)

(51) Int. Cl.
*G06F 3/0484* (2013.01)
*G06F 3/0488* (2013.01)
(Continued)

(52) U.S. Cl.
CPC ........ *G06F 3/04847* (2013.01); *G06F 3/0485* (2013.01); *G06F 3/0488* (2013.01);
(Continued)

(58) Field of Classification Search
CPC .. G06F 3/04847; G06F 3/0485; G06F 3/0488; H04N 5/23216
See application file for complete search history.

(56) References Cited

U.S. PATENT DOCUMENTS

2008/0052945 A1  3/2008  Matas et al.
2009/0178008 A1  7/2009  Herz et al.
(Continued)

FOREIGN PATENT DOCUMENTS

CN  101639758 A  2/2010
JP  2010-55598   9/2011
(Continued)

OTHER PUBLICATIONS

PRIS A unique mobile camera 2012, http://takenbypris.com/ (Year: 2012).*

(Continued)

*Primary Examiner* — Hesham K Abouzahra
(74) *Attorney, Agent, or Firm* — Morgan, Lewis & Bockius LLP

(57) ABSTRACT

A method is performed at an electronic device with a touch-sensitive display and one or more cameras. While device displays a first camera interface, which includes a first camera preview and a first capture affordance for capturing photos with the one or more cameras, the device detects an input that includes movement of a contact across the first camera preview on the touch-sensitive display. In response, the device replaces display of the first camera interface with a second camera interface, which includes a second camera preview and a second capture affordance for initiating capture of video content with the one or more cameras.

36 Claims, 28 Drawing Sheets

Related U.S. Application Data

(60) Provisional application No. 61/832,958, filed on Jun. 9, 2013.

(51) Int. Cl.
   *G06F 3/0485* (2013.01)
   *H04N 5/232* (2006.01)

(52) U.S. Cl.
   CPC ... *H04N 5/23216* (2013.01); *H04N 5/232935* (2018.08); *G06F 2203/04805* (2013.01)

(56) References Cited

U.S. PATENT DOCUMENTS

| | | | |
|---|---|---|---|
| 2010/0026643 A1* | 2/2010 | Ozawa | H04N 5/232933 345/173 |
| 2011/0074824 A1 | 3/2011 | Srinivasan et al. | |
| 2011/0249073 A1 | 10/2011 | Cranfill et al. | |
| 2011/0319138 A1 | 12/2011 | Noh | |
| 2012/0009896 A1* | 1/2012 | Bandyopadhyay | G06K 9/00087 455/411 |
| 2013/0329100 A1* | 12/2013 | Desai | H04N 5/23238 348/262 |
| 2015/0172238 A1* | 6/2015 | Ahmed | H04N 21/4788 709/217 |

FOREIGN PATENT DOCUMENTS

| | | |
|---|---|---|
| JP | 2012-160784 A | 8/2012 |
| WO | WO 2013/051259 A1 | 3/2015 |

OTHER PUBLICATIONS

Colburn, "Multi-Aspect Cam for iPhone", Macworld, https://www.macworld.com/article/1150702/multiaspectcam.html, Apr. 19, 2010, 3 pages.

Forhad, "Camera ICS: Control Existent Camera App for Android," http://thetechjournal.com/electronics/android/camera-ics-control-existent-camera-app-for-android.xhtml, 5 pages.

Graham et al., "Time as Essence for Photo Browsing Through Personal Digital Libraries," JCDL, Portaland, Oregon, Jul. 13-17, 2002, 10 pages.

Mulhem et al., "Home Photo Retrieval: Time Matters," Lecture Notes in Computer Science/Computational Science, Jul. 24, 2003, 10 pages.

Platt et al., "PhotoTOC: Automatic Clustering for Browsing Personal Photographs," Microsoft Research, Proceedings of the 2003 Joint Conference of the Fourth International Conference on Information, Communications and Signal Processing, 2003 and Fourth Pacific Rim Conference on Multimedia, Dec. 2003, 5 pages.

Radhakrishnan et al, "A Time Series Clustering based Framework for Multimedia Mining and Summarization using Audio Features," Proceedings of the 6th ACM SIGMM International Workshop on Multimedia Information Retrieval, Oct. 15-16, 2004, 8 pages.

Reuter et al., "Event-based Classification of Social Media Streams," Proceedings of the 2nd ACM International Conference on Multimedia Retrieval, Jun. 5-8, 2012, 8 pages.

Samsung, "GT-I9300 User Manual," www.onlinedown.net/soft/374120.htm, Sep. 4, 2012, 185 pages.

Sharara et al., "Finding Prominent Actors in Dynamic Affiliation Networks," ASE, Nov. 19, 2012, 14 pages.

Windows Phone Central, "Sketch Camera, Windows Phone App Review," https://www.youtube.com/watch?v=KC3CMUwof9U, Mar. 7, 2012, 1 page.

Office Action, dated Feb. 25, 2016, received in U.S. Appl. No. 14/290,922, 30 pages.

Office Action, dated Dec. 27, 2017, received in U.S. Appl. No. 14/290,922, 19 pages.

Final Office Action, dated Mar. 22, 2017, received in U.S. Appl. No. 14/290,922, 18 pages.

Office Action, dated Aug. 30, 2016, received in U.S. Appl. No. 14/290,922, 23 pages.

Notice of Allowance, dated Aug. 29, 2018, received in U.S. Appl. No. 14/290,922, 9 pages.

Office Action, dated Dec. 4, 2017, received in Chinese Patent Application No. 201480032640.9, which corresponds with U.S. Appl. No. 14/290,922, 6 pages.

Office Action, dated May 23, 2017, received in European Patent Application No. 14733909.7, which corresponds with U.S. Appl. No. 14/290,922, 10 pages.

Office Action, dated Jul. 11, 2018, received in European Patent Application No. 14733909.7, which corresponds with U.S. Appl. No. 14/290,922, 6 pages.

Office Action, dated Nov. 14, 2016, received in Japanese Patent Application No. 2016-519535, which corresponds with U.S. Appl. No. 14/290,922, 4 pages.

Office Action, dated Oct. 2, 2017, received in Japanese Patent Application No. 2016-519535, which corresponds with U.S. Appl. No. 14/290,922, 8 pages.

Decision of Grant, dated Apr. 16, 2018, received in Japanese Patent Application No. 2016-519535, which corresponds with U.S. Appl. No. 14/290,922, 4 pages.

Patent, dated May 25, 2018, received in Japanese Patent Application No. 2016-519535, which corresponds with U.S. Appl. No. 14/290,922, 2 pages.

Patent, dated Jun. 21, 2017, received in Korean Patent Application No. 2015-7036748, which corresponds with U.S. Appl. No. 14/290,922, 3 pages.

International Search Report, dated Jun. 25, 2014, received in International Patent Application No. PCT/US2014,018908, which corresponds with U.S. Appl. No. 14/183,405, 7 pages.

International Preliminary Report on Patentability, dated Sep. 15, 2015, received in International Patent Application No. PCT/US2014/018908, which corresponds with U.S. Appl. No. 14/183,405, 9 pages.

International Search Report, dated Sep. 4, 2014, received in International Patent Application No. PCT/US2014/040413, which corresponds with U.S. Appl. No. 14/290,922, 4 pages.

International Preliminary Report on Patentability, dated Dec. 15, 2015, recieved in International Patent Application No. PCT/US2014/040413, which corresponds with U.S. Appl. No. 14/290,922, 14 pages.

Office Action, dated Oct. 15, 2018, received in Chinese Patent Application No. 201480032640.9, which corresponds with U.S. Appl. No. 14/290,922, 3 pages.

Office Action, dated May 17, 2019, received in Chinese Patent Application No. 201480032640.9, which corresponds with U.S. Appl. No. 14/290,922, 4 pages.

Office Action, dated Jun. 14, 2019, received in European Patent Application No. 14733909.7, which corresponds with U.S. Appl. No. 14/290,922, 5 pages.

Notice of Allowance, dated Sep. 4, 2019, received in Chinese Patent Application No. 201480032640.9, which corresponds with U.S. Appl. No. 14/290,922, 3 pages.

Patent, dated Nov. 1, 2019, received in Chinese Patent Application No. 201480032640.9, which corresponds with U.S. Appl. No. 14/290,922, 6 pages.

* cited by examiner

- The third camera interface provides a visual indication of the third output dimensions
- The third output dimensions have a different aspect ratio than the first output dimensions and the second output dimension
- The third camera interface includes one or more controls that are not included in the first camera interface and the second camera user interface
- The first virtual camera, the second virtual camera and the third virtual camera use a same physical camera sensor with respective sensor dimensions to produce media; the media produced by one of the virtual cameras has dimensions that are smaller than the respective sensor dimensions of the physical camera sensor; and the media produced by a different one of the virtual cameras has dimensions that are larger than the respective sensor dimensions of the physical camera sensor
- The media produced by a different one of the virtual cameras has dimensions that are the same as the sensor dimensions of the physical camera sensor
- The first camera interface, the second camera interface and the third camera interface have a set of one or more common controls, including a respective common control; and the respective common control is displayed in a same location on the display in the first camera interface, the second camera interface and the third camera interface
- The first camera interface, the second camera interface, and the third camera interface include a video camera interface and two different still camera interfaces
- The first camera interface, the second camera interface, and the third camera interface are selected from the set consisting of: a rectangular still camera interface, a video camera interface, a panorama still camera interface, a black and white still camera interface, and a square still camera interface

Figure 6G

DEVICE, METHOD, AND GRAPHICAL USER INTERFACE FOR SWITCHING BETWEEN CAMERA INTERFACES

RELATED APPLICATIONS

This application is a continuation of U.S. patent application Ser. No. 14/290,922, filed May 29, 2014, which claims priority to U.S. Provisional Patent Application No. 61/832,958, filed Jun. 9, 2013, each of which is incorporated by reference herein in its entirety.

TECHNICAL FIELD

This relates generally to electronic devices with touch-sensitive surfaces, including but not limited to electronic devices with touch-sensitive surfaces that include multiple camera interfaces.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display or to activate various features of the devices. For example, a user can use a camera application on the device to capture still images or videos.

But methods for switching modes in a camera application are cumbersome and inefficient. For example, current methods for switching modes or interfaces in a camera application include the user activating a toggle switch or navigating through a complex sequence of menus and settings interfaces. The toggle switch may be inconveniently placed with respect to the positioning of the hands and fingers of the user when the user is holding the device in preparation for capturing images or videos. Further, toggle switches are not very effective for switching between more than two modes. Thus, a more effective and convenient method of switching between camera modes is needed.

SUMMARY

Accordingly, there is a need for electronic devices with faster, more efficient methods and interfaces for switching between camera interfaces. Such methods and interfaces optionally complement or replace conventional methods for switching between camera interfaces. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions optionally include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions are, optionally, included in a non-transitory computer readable storage medium or other computer program product configured for execution by one or more processors.

In accordance with some embodiments, a method is performed at an electronic device with a display, a touch-sensitive surface and a camera. The method includes: displaying a first camera interface on the display for a first virtual camera that produces media with first output dimensions; while displaying the first camera interface on the display, detecting a first gesture that includes movement of a contact in a first direction on the touch-sensitive surface, wherein the first gesture does not interact with a predefined camera-switching affordance; and, in response to detecting the first gesture, switching from displaying the first camera interface to displaying a second camera interface for a second virtual camera that produces media with second output dimensions different from the first output dimensions, wherein the second camera interface is different from the first camera interface.

In accordance with some embodiments, an electronic device includes a display unit configured to display a first camera interface for a first virtual camera that produces media with first output dimensions, a touch-sensitive surface unit configured to receive contacts and gestures, a camera unit, and a processing unit coupled to the display unit, the touch-sensitive surface unit, and the camera unit. The processing unit is configured to: while enabling display of the first camera interface on the display unit, detect a first gesture that includes movement of a contact in a first direction on the touch-sensitive surface unit, where the first gesture does not interact with a predefined camera-switching affordance; and in response to detecting the first gesture, switch from enabling display of the first camera interface to enabling display of a second camera interface for a second virtual camera that produces media with second output dimensions different from the first output dimensions, where the second camera interface is different from the first camera interface.

In accordance with some embodiments, an electronic device includes a display, a touch-sensitive surface, a camera, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a camera, a memory, and one or more processors to execute one or more programs stored in the memory includes one or more of the elements displayed in any of the methods described above, which are updated in response to inputs, as described in any of the methods described above. In accordance with some embodiments, a computer readable storage medium has stored therein instructions which when executed by an electronic device with a display, a touch-sensitive surface, and a camera, cause the device to perform the operations of any of the methods referred described above. In accordance with some embodiments, an electronic device includes: a display, a touch-sensitive surface, a camera; and means for performing the operations of any of the methods described above. In accordance with some embodiments, an information processing apparatus, for use in an electronic device with a display, a touch-sensitive surface, and a camera, includes means for performing the operations of any of the methods described above.

Thus, electronic devices with displays, touch-sensitive surfaces, and cameras are provided with faster, more efficient methods and interfaces for switching between camera interfaces, thereby increasing the effectiveness, efficiency, and user satisfaction with such devices. Such methods and interfaces may complement or replace conventional methods for switching between camera interfaces.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIGS. 6A-6G are flow diagrams illustrating a method of switching between camera interfaces in accordance with some embodiments.

DESCRIPTION OF EMBODIMENTS

Figure 1A:
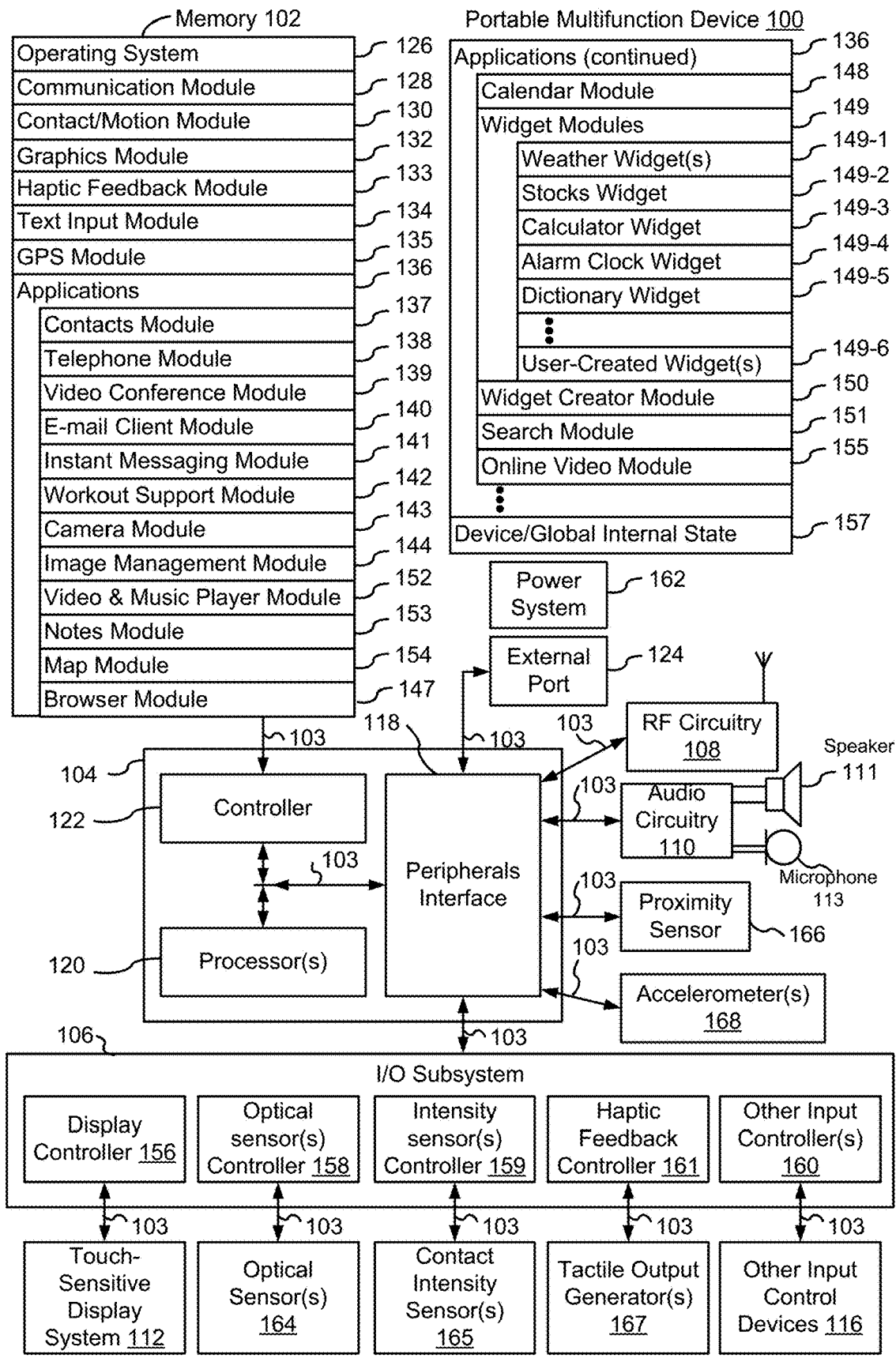
FIG. 1A is a block diagram illustrating a portable multifunction device with a touch-sensitive display in accordance with some embodiments.

Many electronic devices have cameras with a still camera mode and a video camera mode. With advancements in hardware and software, the device can support even more modes for the camera. With the increase in different modes for the camera, switching amongst them can be inefficient. Typically, the user switches amongst the modes using switches, buttons or some other affordances that are displayed at locations on the display that are not the most convenient (e.g., navigating through a series of menus and settings interfaces). Particularly, if the device is a touchscreen device, poor placement of the mode switching affordances hinders quick access to different camera modes when such quick access is desirable. The embodiments below describe methods for quickly switching between camera interfaces that correspond to different camera modes. The user switches amongst a sequence of at least two camera interfaces using swipe gestures across the touch-sensitive surface in opposing directions. This makes switching between camera modes more efficient and easier to use.

Below, FIGS. 1A-1B, 2, and 3 provide a description of exemplary devices. FIGS. 4A-4B and 5A-5N illustrate exemplary user interfaces for switching between camera interfaces. FIGS. 6A-6G are flow diagrams illustrating a method of switching between camera interfaces. The user interfaces in FIGS. 5A-5N are used to illustrate the processes in FIGS. 6A-6G.

Exemplary Devices

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch sensitive surface, or to a substitute (proxy) for the force or pressure of a contact on the touch sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits.

Memory 102 optionally includes high-speed random access memory and optionally also includes non-volatile memory, such as one or more magnetic disk storage devices, flash memory devices, or other non-volatile solid-state memory devices. Access to memory 102 by other components of device 100, such as CPU 120 and the peripherals interface 118, is, optionally, controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device, so that the touch screen display is enabled for use as a viewfinder for still and/or video image acquisition. In some embodiments, another optical sensor is located on the front of the device so that the user's image is, optionally, obtained for videoconferencing while the user views the other video conference participants on the touch screen display.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is coupled to input controller 160 in I/O subsystem 106. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
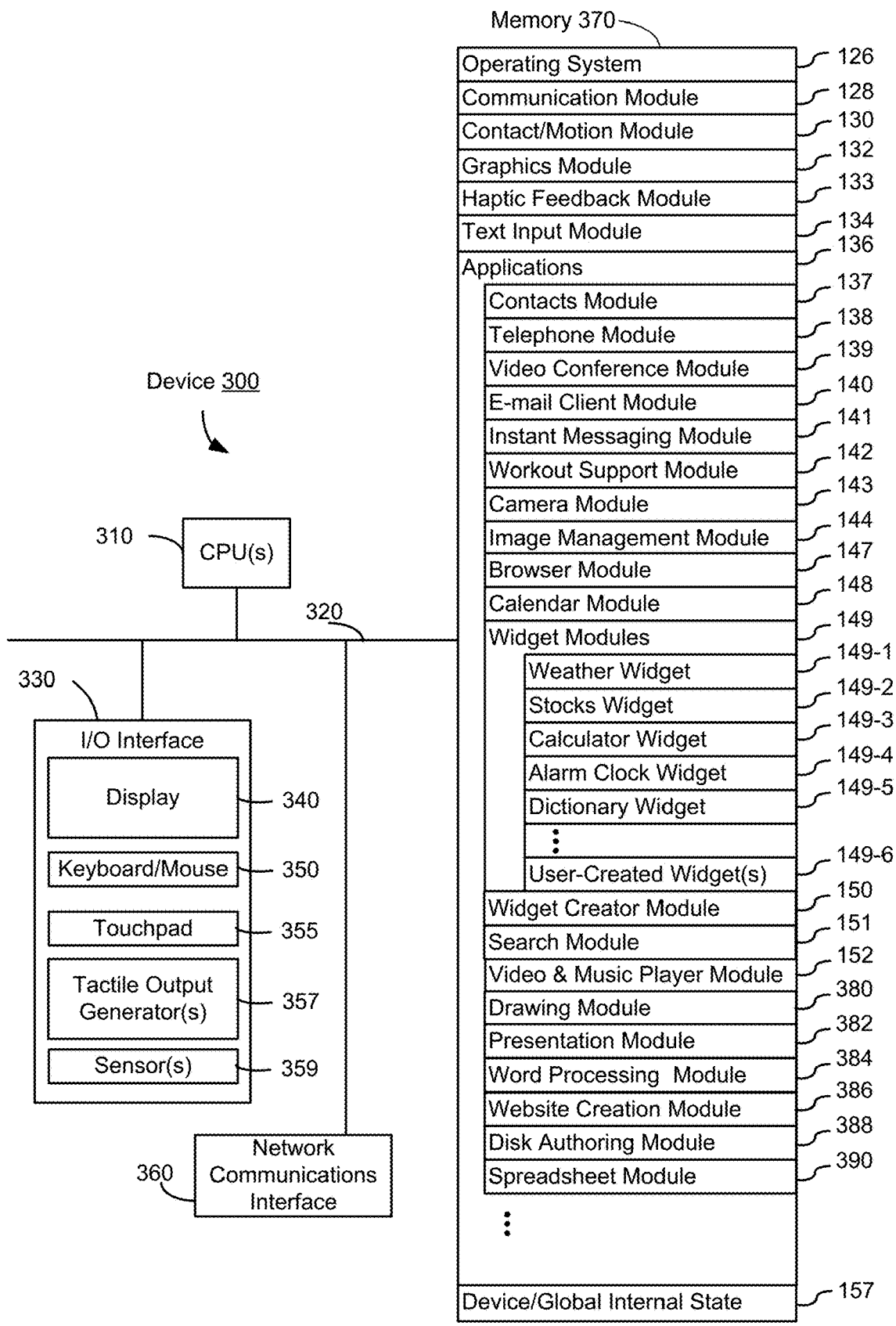
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined thresholds values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);

telephone module 138;
video conferencing module 139;
e-mail client module 140;
instant messaging (IM) module 141;
workout support module 142;
camera module 143 for still and/or video images;
image management module 144;
browser module 147;
calendar module 148;
widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
widget creator module 150 for making user-created widgets 149-6;
search module 151;
video and music player module 152, which is, optionally, made up of a video player module and a music player module;
notes module 153;
map module 154; and/or
online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 are, optionally, used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages optionally include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130 graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 are, optionally, used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 are, optionally, used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
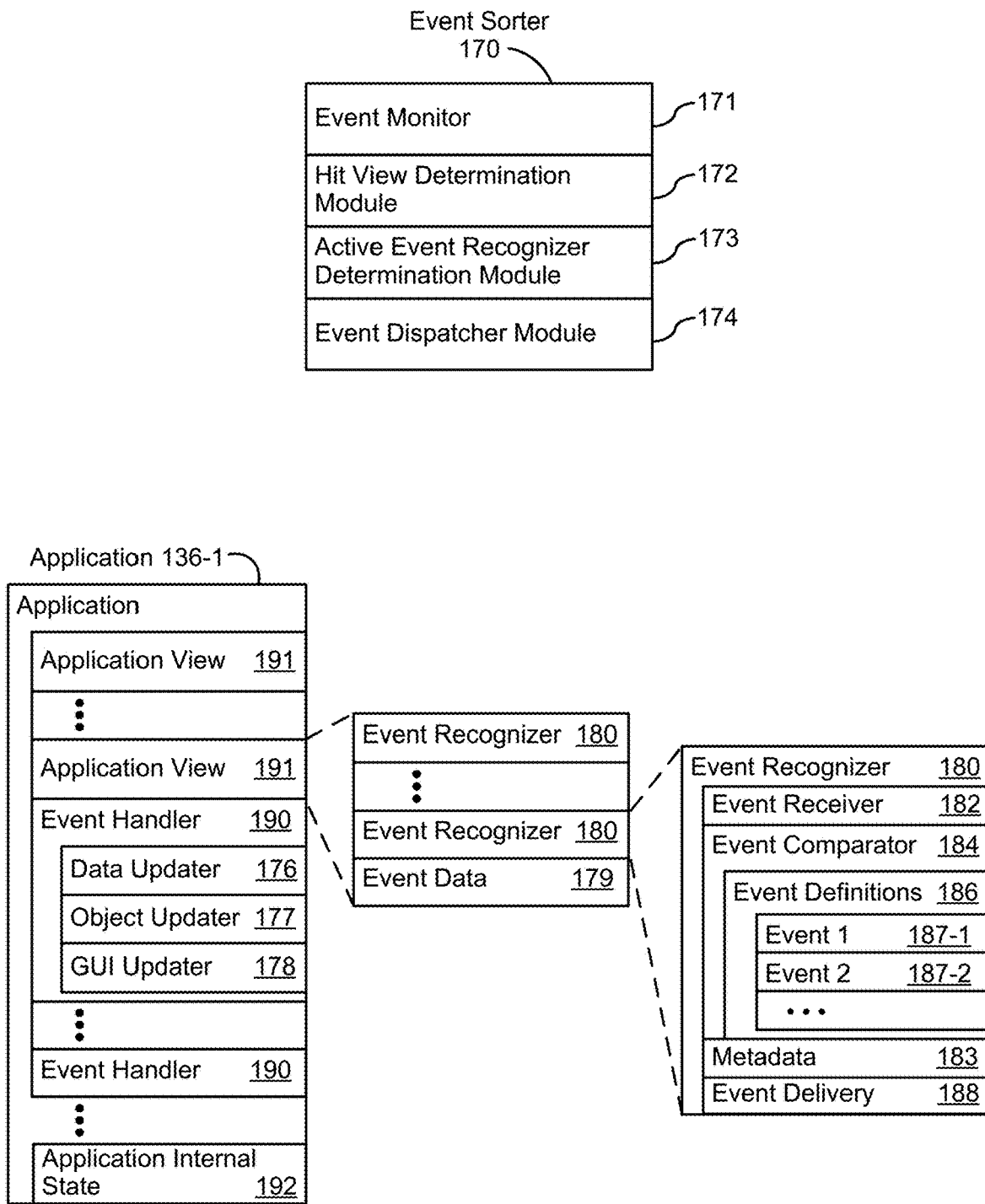
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-13, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens. For example, mouse movement and mouse button presses, optionally coordinated with single or multiple keyboard presses or holds; contact movements such as taps, drags, scrolls, etc., on touch-pads; pen stylus inputs; movement of the device; oral instructions; detected eye movements; biometric inputs; and/or any combination thereof are optionally utilized as inputs corresponding to sub-events which define an event to be recognized.

Figure 2:
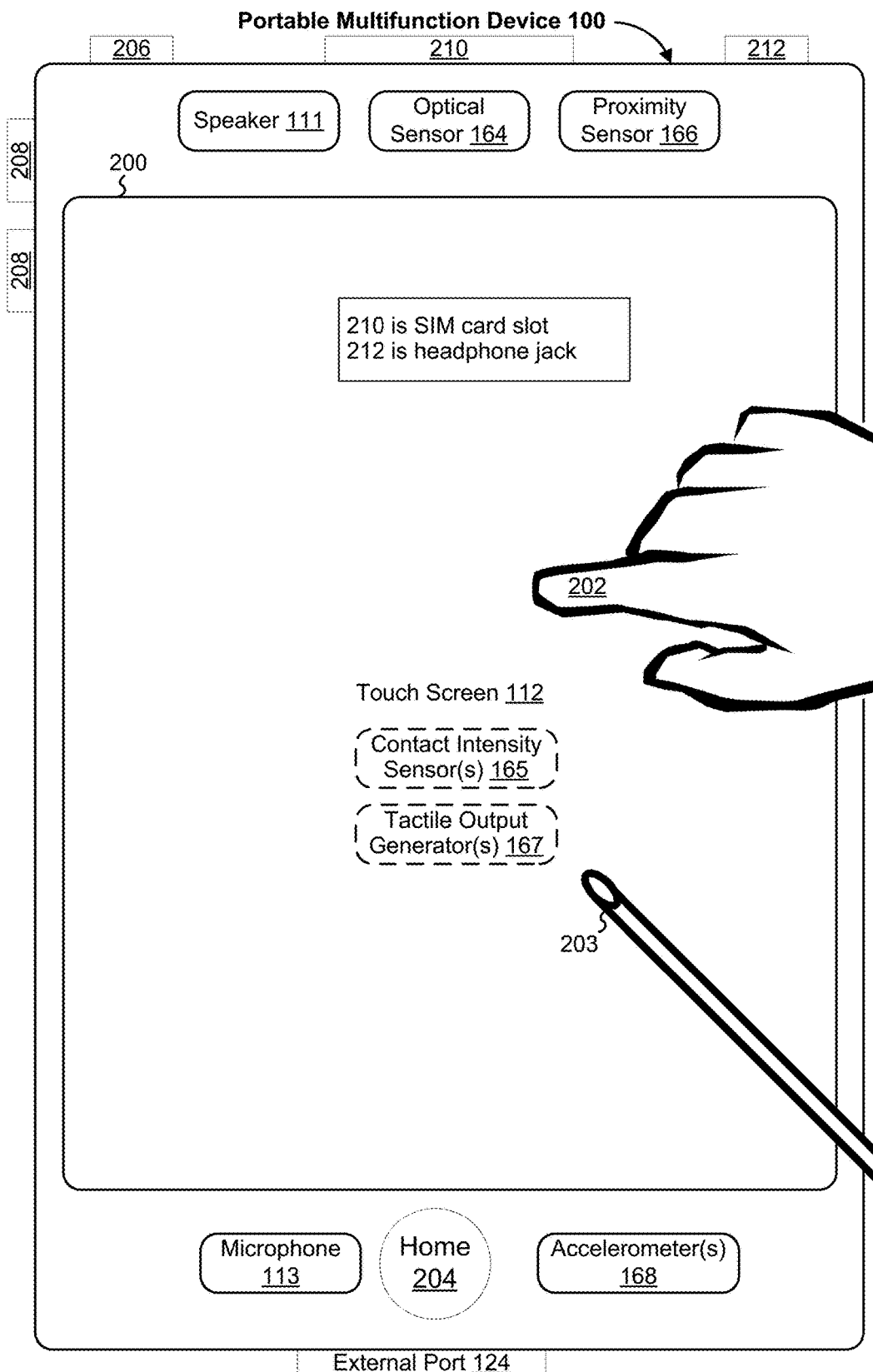
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As described previously, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Attention is now directed towards embodiments of user interfaces ("UI") that is, optionally, implemented on portable multifunction device 100.

Figure 4A:
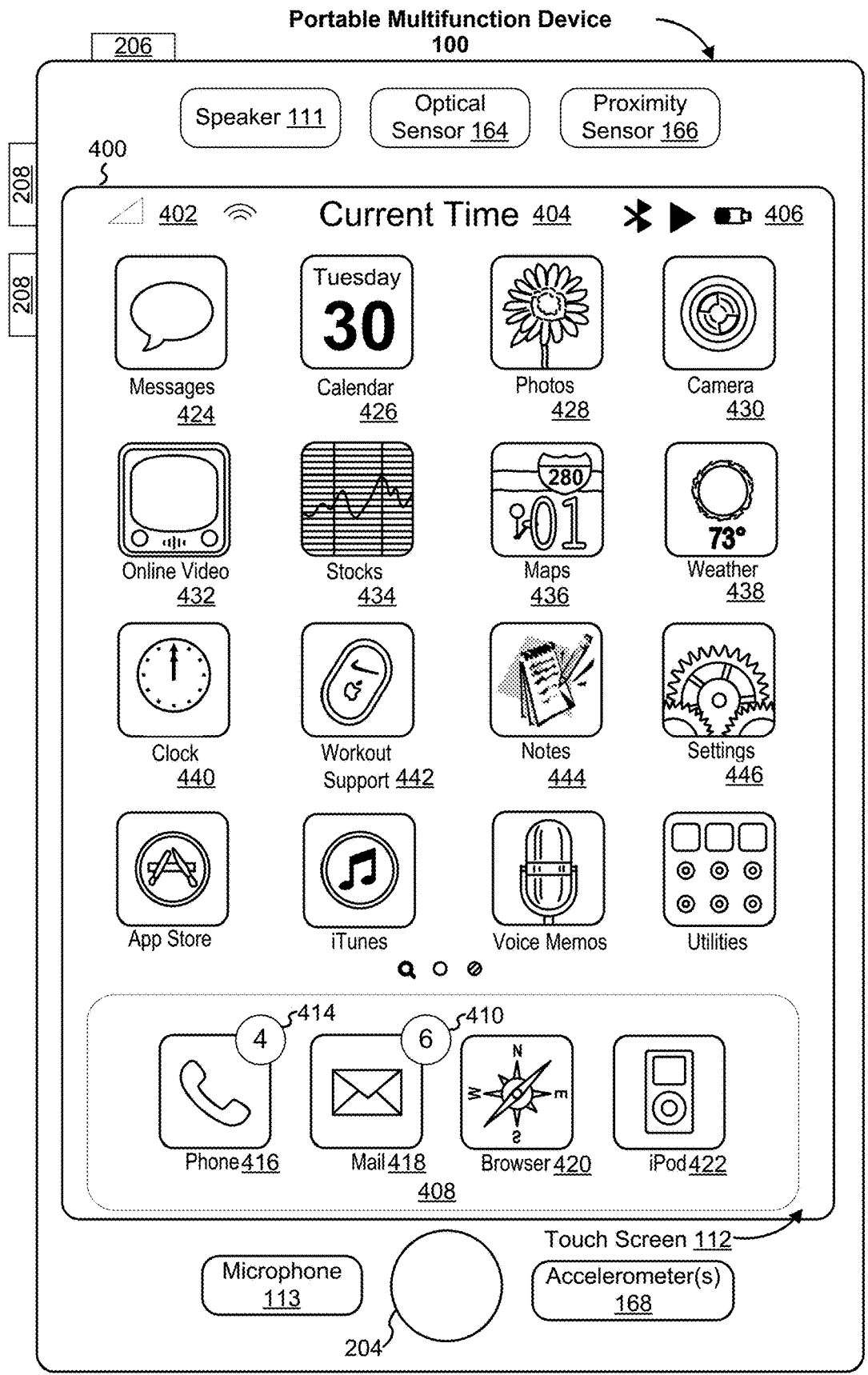
FIG. 4A illustrates an exemplary user interface for a menu of applications on a portable multifunction device in accordance with some embodiments.
Figure 5A:
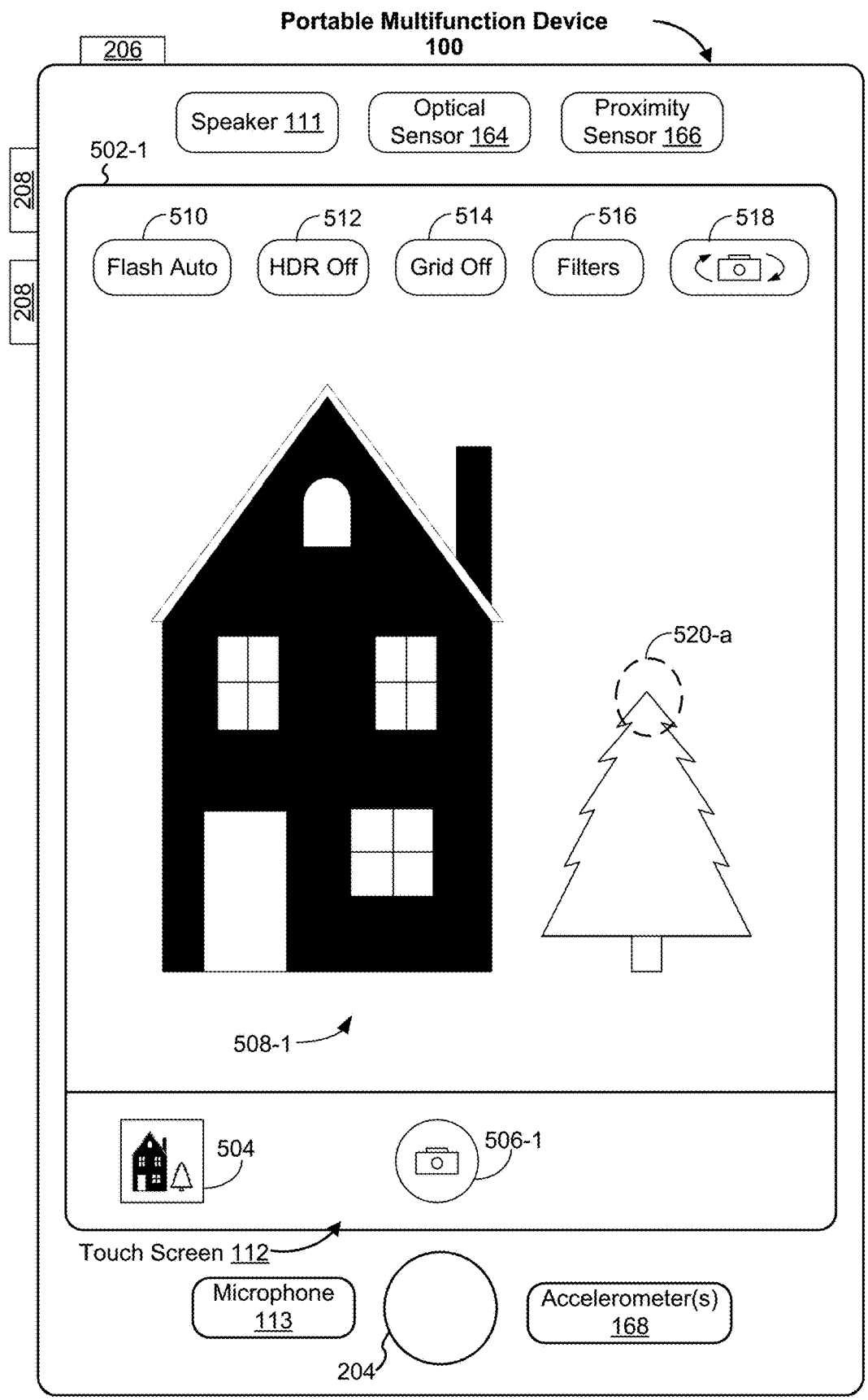
FIGS. 5A-5N illustrate exemplary user interfaces for switching between camera interfaces in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled-Phone," which optionally includes an indicator 414 of the number of missed calls or voicemail messages;
  Icon 418 for e-mail client module 140 labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Text;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video"
  Icon 434 for stocks widget 149-2, labeled "Stocks;"
  Icon 436 for map module 154, labeled "Map;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, which provides access to settings for device 100 and its various applications 136.

It should be noted that the icon labels illustrated in FIG. 4A are merely exemplary. For example, icon 422 for video and music player module 152 are labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
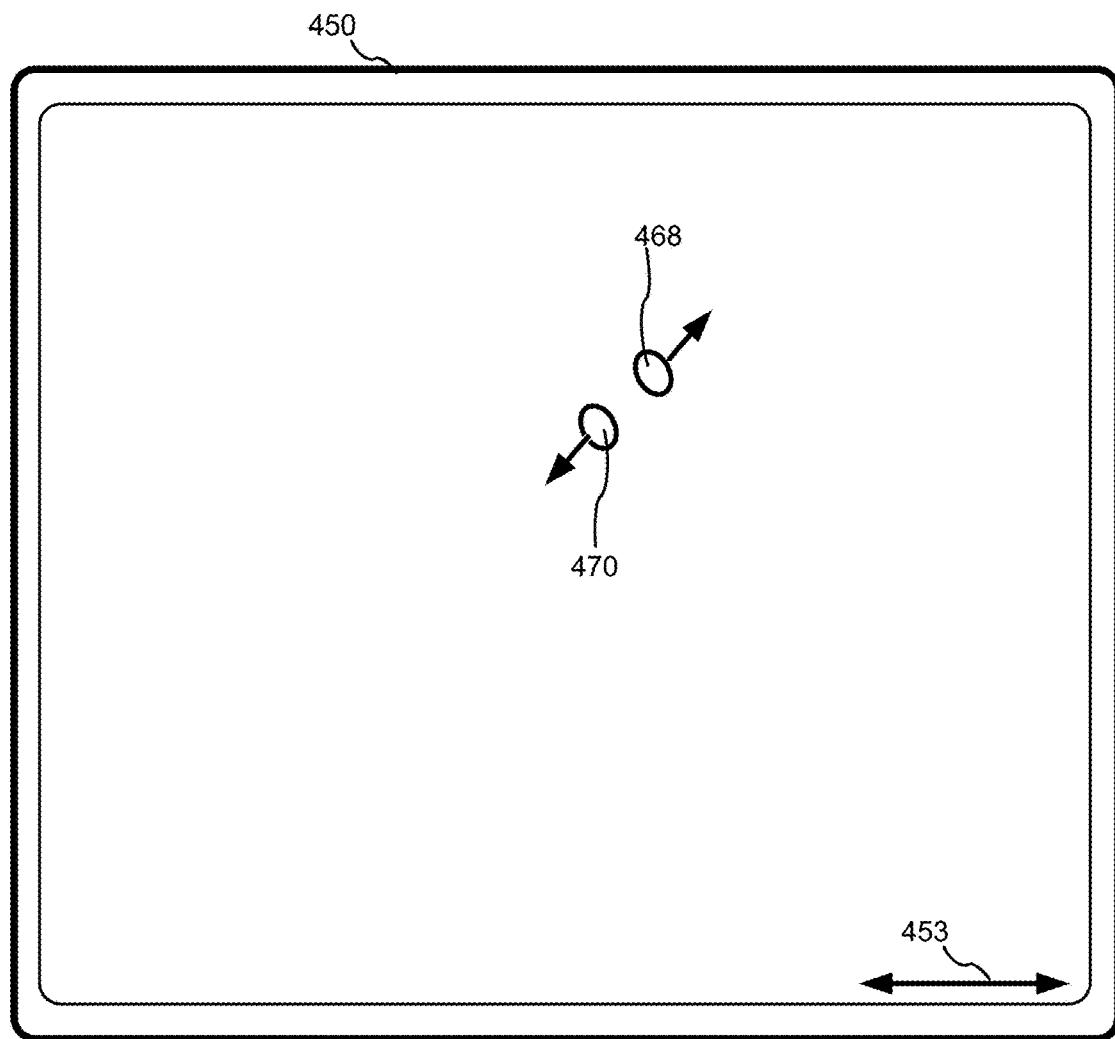
FIG. 4B illustrates an exemplary user interface for a multifunction device with a touch-sensitive surface that is separate from the display in accordance with some embodiments.
Figure 4B:
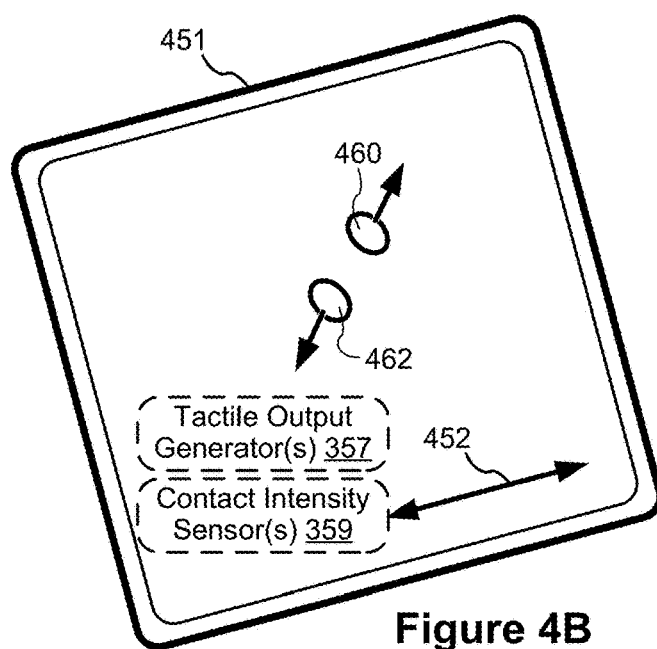

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples which follow will be given with reference to inputs on touch screen display 112 (where the touch sensitive surface and the display are combined), in some embodiments, the device detects inputs on a touch-sensitive surface that is separate from the display, as shown in FIG. 4B. In some embodiments the touch sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

User Interfaces and Associated Processes

Attention is now directed towards embodiments of user interfaces ("UI") and associated processes that may be implemented on an electronic device with a display, a touch-sensitive surface, and a camera, such as device 300 or portable multifunction device 100.

FIGS. 5A-5N illustrate exemplary user interfaces for switching between camera interfaces in accordance with some embodiments. The user interfaces in these figures are used to illustrate the processes described below, including the processes in FIGS. 6A-6G.

FIG. 5A illustrates camera interface 502-1 being displayed on touch screen 112. Camera interface 502-1 is one of multiple interfaces 502 for a camera application (e.g., camera module 143). Each of the interfaces corresponds to a virtual camera or a camera mode. For example, camera interface 502-1 corresponds to a standard camera mode or a virtual standard camera.

Camera interface 502-1 includes camera roll icon 504, shutter button 506-1, camera preview 508-1, and one or more controls. The controls include, for example, flash control 510, high-dynamic-range (HDR) control 512, grid control 514, filters control 516, and front/back camera control 518. Device 100 displays a camera roll (e.g., a set of pictures and videos captured by the camera on device 100) in response to activation of camera roll icon 504. Activation of flash control 510 activates display of a set of flash options (e.g., on, off, automatic) for user selection on touch screen 112. Activation of HDR control 512 toggles high dynamic range functionality for camera interface 502-1. Activation of grid control 514 toggles display of grid lines on camera preview 508-1. Activation of filters control 516 activates display of a set of filter options 556 (FIG. 5L) for user selection on touch screen 112. Activation of front/back camera control 518 toggles between activating a back-facing camera on device 100 and activating a front-facing camera on device 100.

Camera preview 508 displays visual data sensed by the camera on device 100. Camera preview 508 gives the user a preview of what would be included in media captured by the camera on device 100.

Figure 5B:
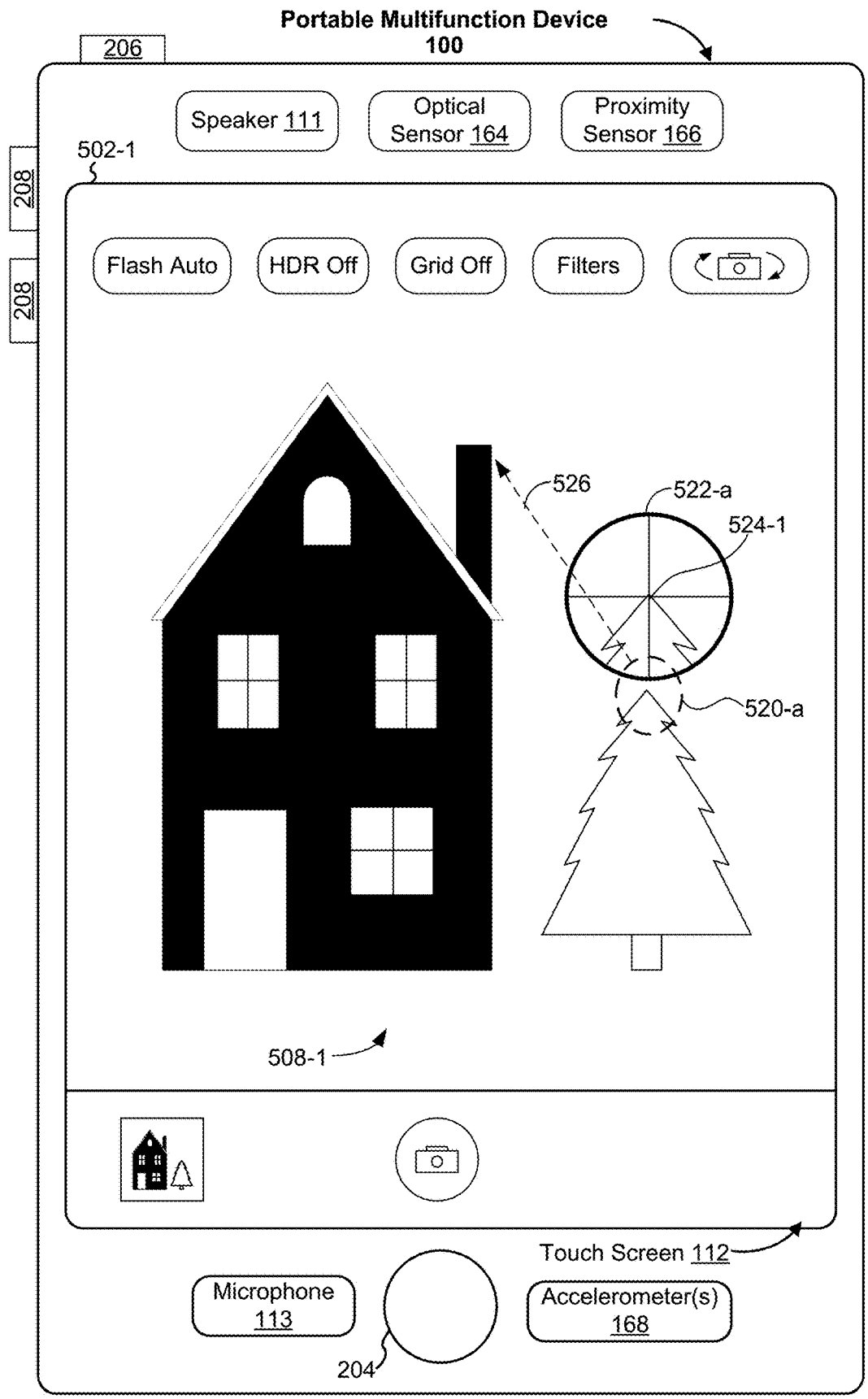

FIG. 5A shows device 100 detecting gesture (e.g., a tap-and-hold gesture) with contact 520, at location 520-a on camera preview 508-1. In response to detecting the gesture with contact 520, device 100 displays magnified area (which can also be referred to as an "autofocus loupe") 522 at location 522-a in proximity to contact 520 at location 520-a, as shown in FIG. 5B. Within autofocus loupe 522, a zoom-in view of the vicinity of contact 520 is displayed. Point 524-1 on the zoom-in view in autofocus loupe 522 (e.g., a point corresponding to the center of magnified area 522) is selected as an autofocus reference point.

Figure 5C:
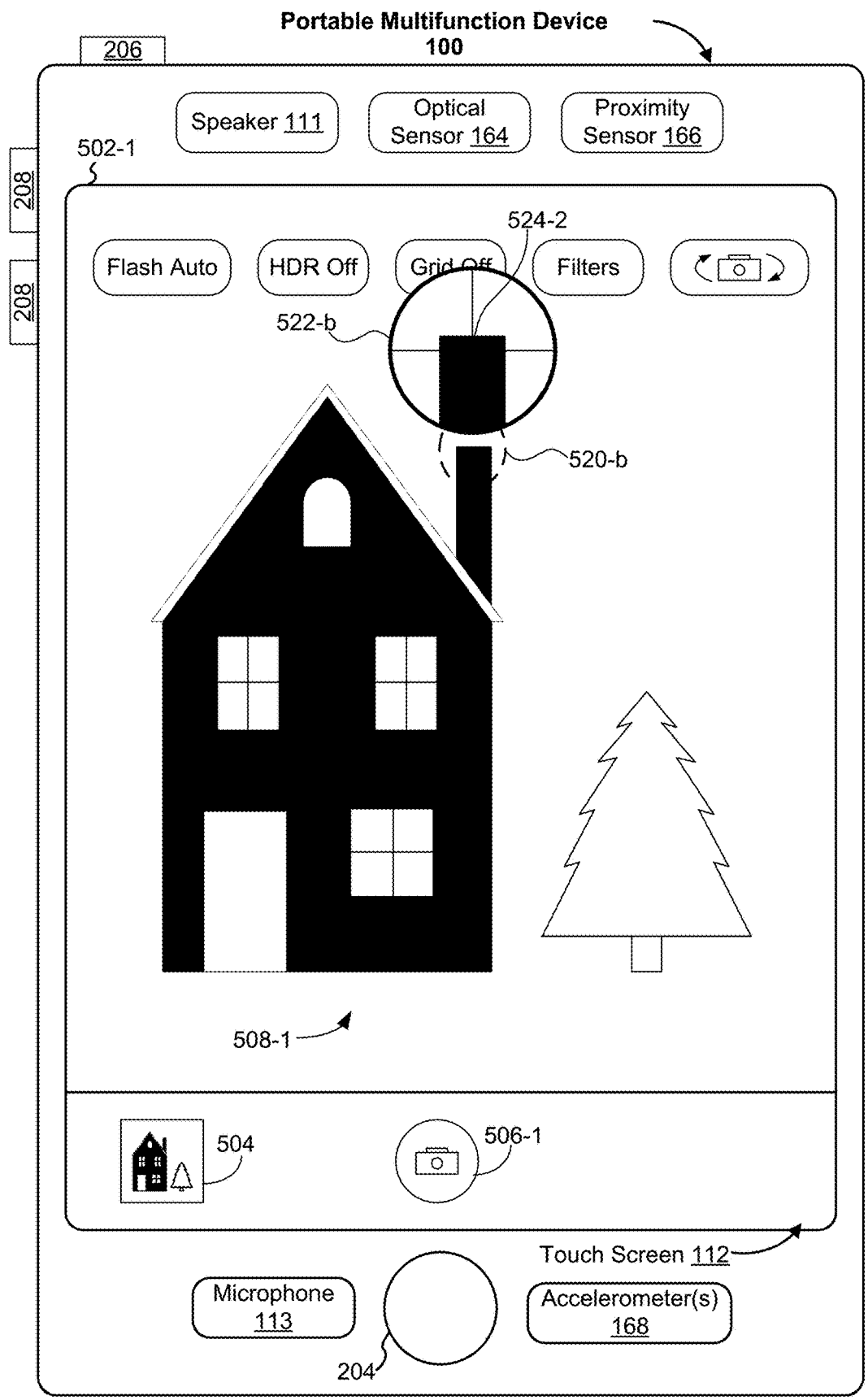

FIGS. 5B-5C shows contact 520, while still maintaining contact with touch screen 112, moving in direction 526 to location 520-b. In response to detecting the movement of contact 520, device 100 moves autofocus loupe 522 to location 522-b in proximity to contact 520 at location 520-b, as shown in FIG. 5C. Point 524-2 on the zoom-in view in autofocus loupe 522 (e.g., a point corresponding to the center of autofocus loupe 522) is selected as the new autofocus reference point.

In some embodiments, when a contact is detected on touch screen 112, the input made with the contact activates either display of autofocus loupe 522 and selection of an autofocus reference point, or switching from the currently displayed camera interface 502 to another camera interface 502. In some embodiments, a criterion for determining which of the two operations to activate is whether the contact moves by more than a predefined amount on touch screen 112 within a predefined time period. If the contact is stationary or substantially stationary for the predefined time period from contact with touch screen 112 (e.g., contact 520 in FIG. 5A), then autofocus loupe 522 is displayed and an autofocus reference point is selected.

Figure 5D:
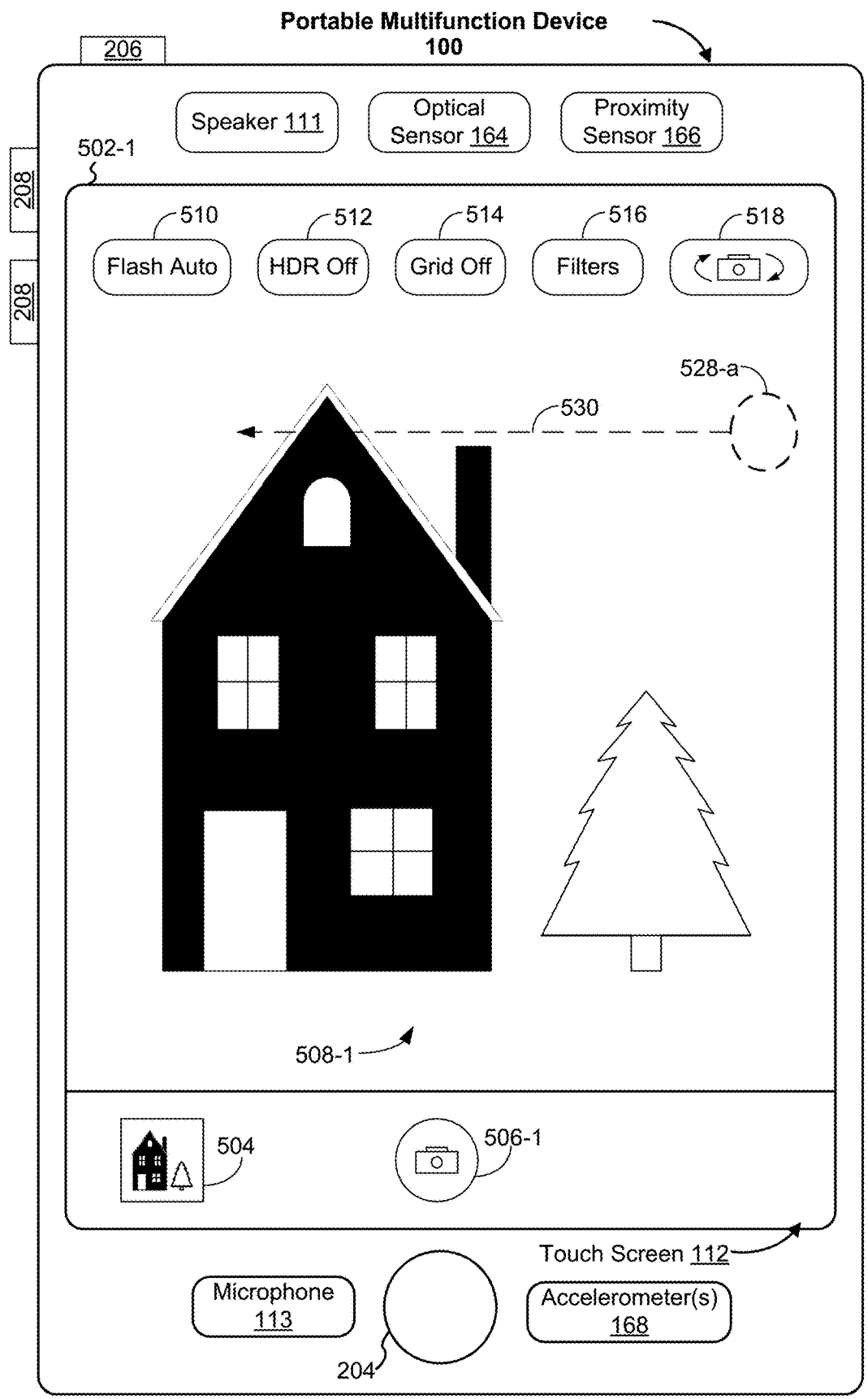

On the other hand, if the contact moves within the predefined time period from contact with touch screen 112, then device 100 switches the currently displayed camera interface 502 to another camera interface 502. For example, FIG. 5D shows a gesture (e.g. a swipe gesture) with contact 528 detected at location 528-a on touch screen 112. The gesture includes contact 528 moving in direction 530 to location 528-b (FIG. 5E) and beyond. Contact 528 moves within the predefined time period from contact with touch screen 112. The gesture does not interact with any camera interface-switching affordance. Further, contact 528, in its movement, moves over camera preview 508-1, and does not move over any displayed affordance for controlling operation of the camera (e.g., camera roll icon 504; shutter button 506-1; controls 510, 512, 514, 516, and 518). In response to detecting the movement of contact 528, device 100 switches from camera interface 502-1 to camera interface 502-2, as shown in FIGS. 5E-5H.

In some embodiments, the switching of the camera interfaces includes an animation showing the transition from one interface to the other. In some embodiments, the animation depicts a lens switch effect. The animation includes, for example, displaying of respective blurred images, which correspond to visual data recently detected by the camera (e.g., visual data that was last shown in camera preview 508 prior to the animation), associated with the interface being switched out and the interface being switched in. The animation also includes, for example, translation of the blurred image associated with the switched-out camera interface off of the display and translation of the blurred image associated with the switched-in camera interface onto the display.

Figure 5E:
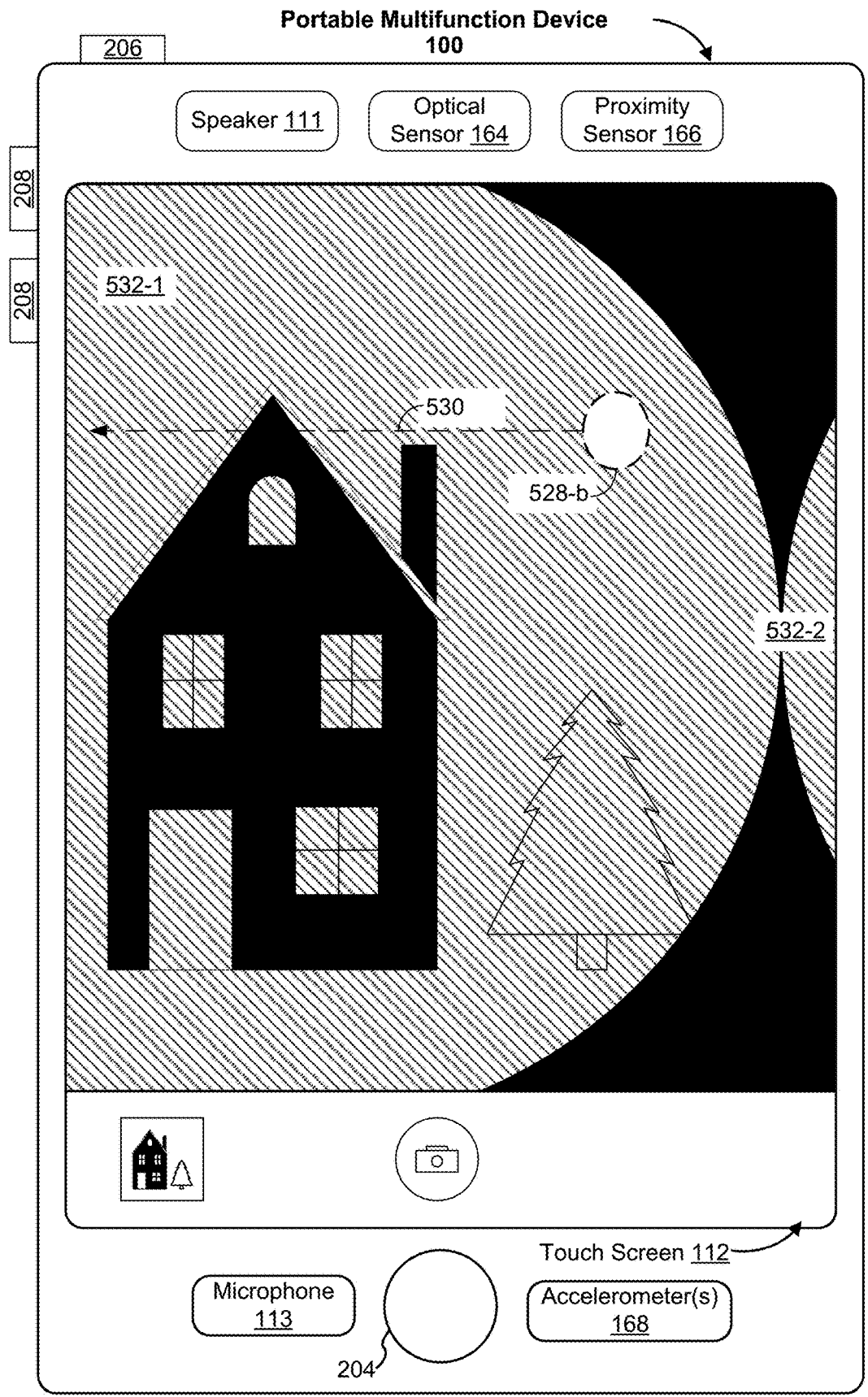
Figure 5F:
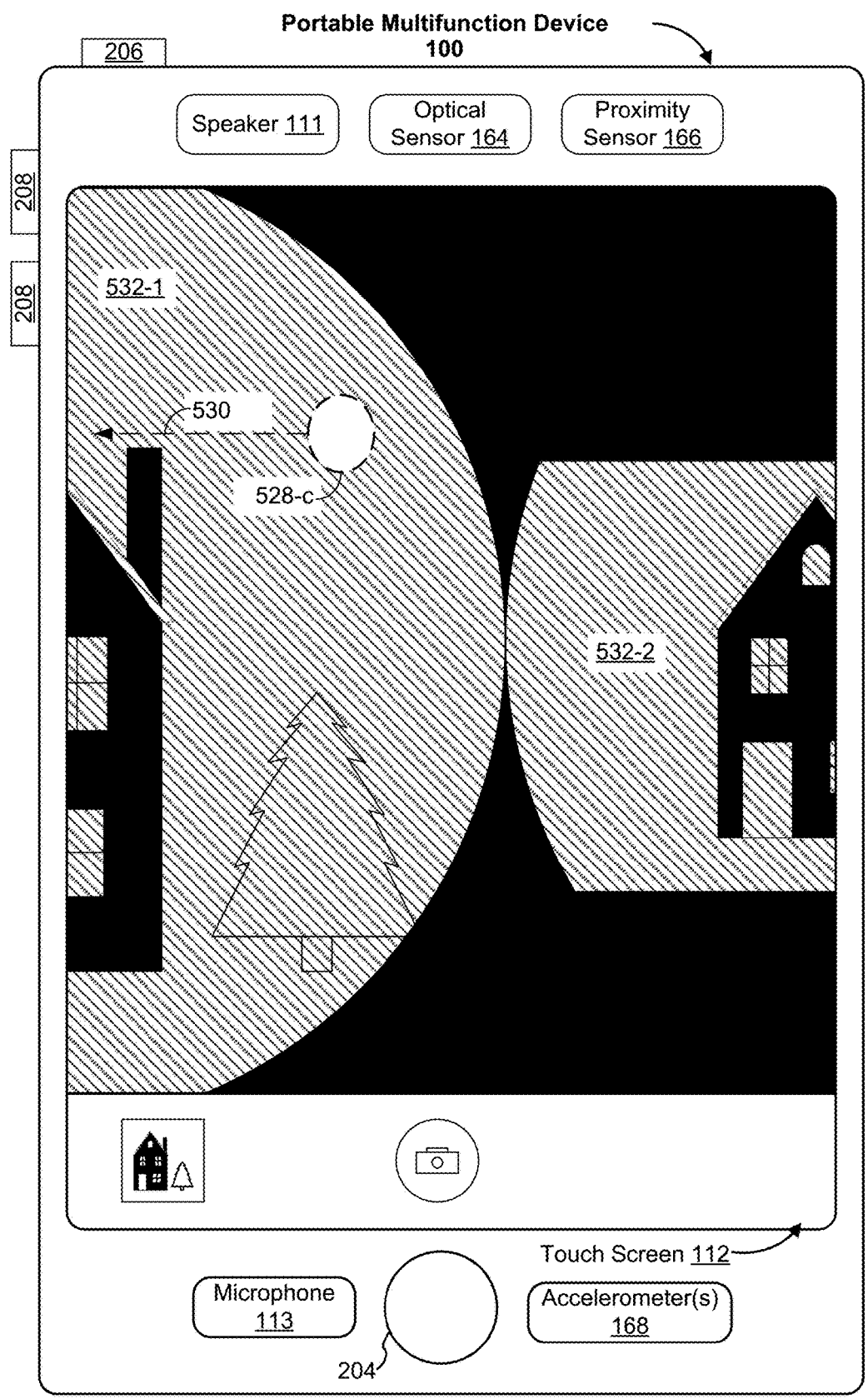
Figure 5G:
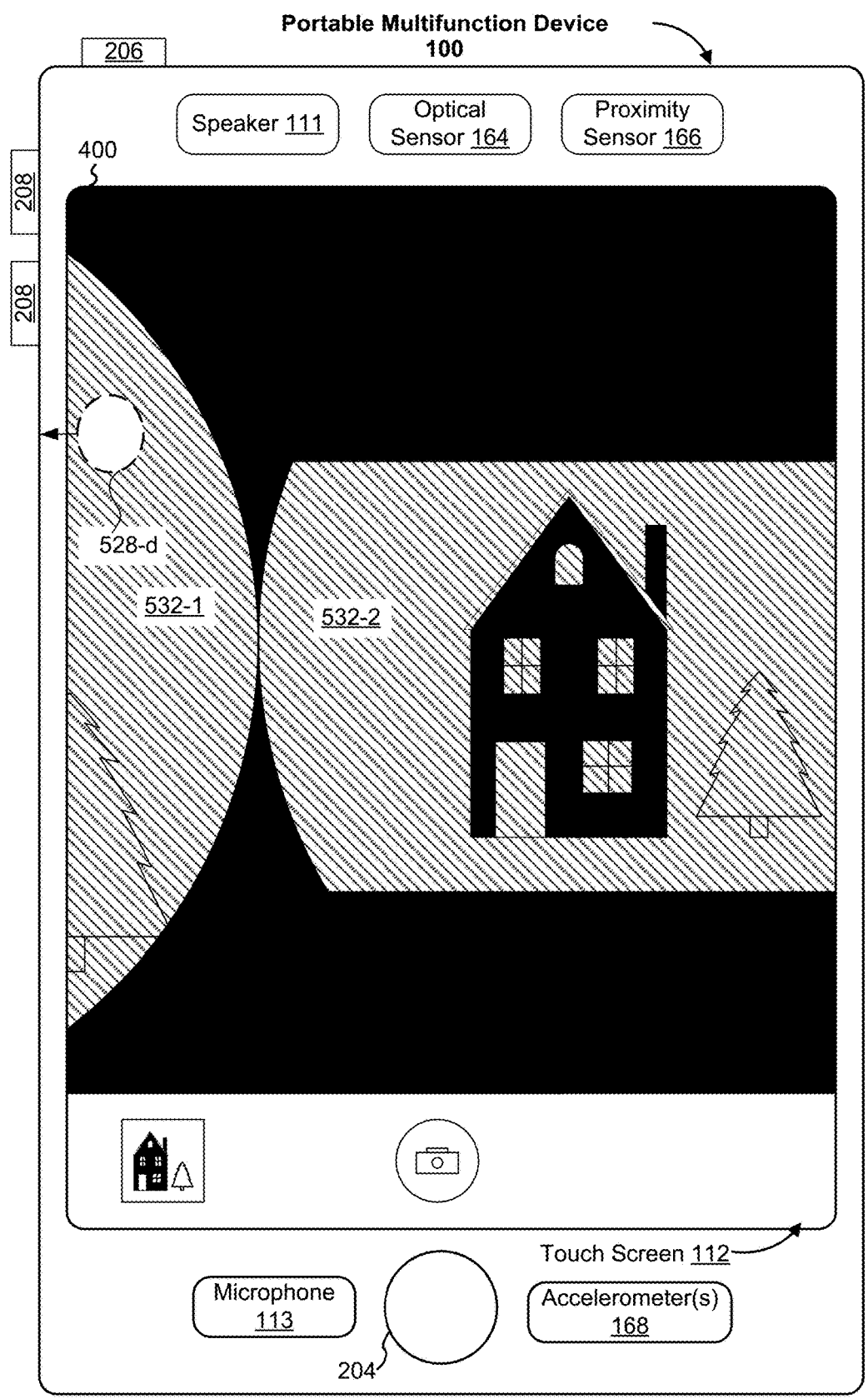

Thus, for example, FIG. 5E shows blurred image 532-1, which is associated with camera interface 502-1, displayed on touch screen 112. As contact 528 continues moving in direction 530, blurred image 532-1 translates off touch screen in direction 530, and blurred image 532-2, which is associated with camera interface 502-2, translates onto touch screen 112 in direction 530. FIGS. 5F-5G show, as contact continues movement in direction 520 to locations 528-c and 528-d, blurred image 532-1 continues translating off touch screen 112 and blurred image 532-2 continues translating onto touch screen 112.

Figure 5H:
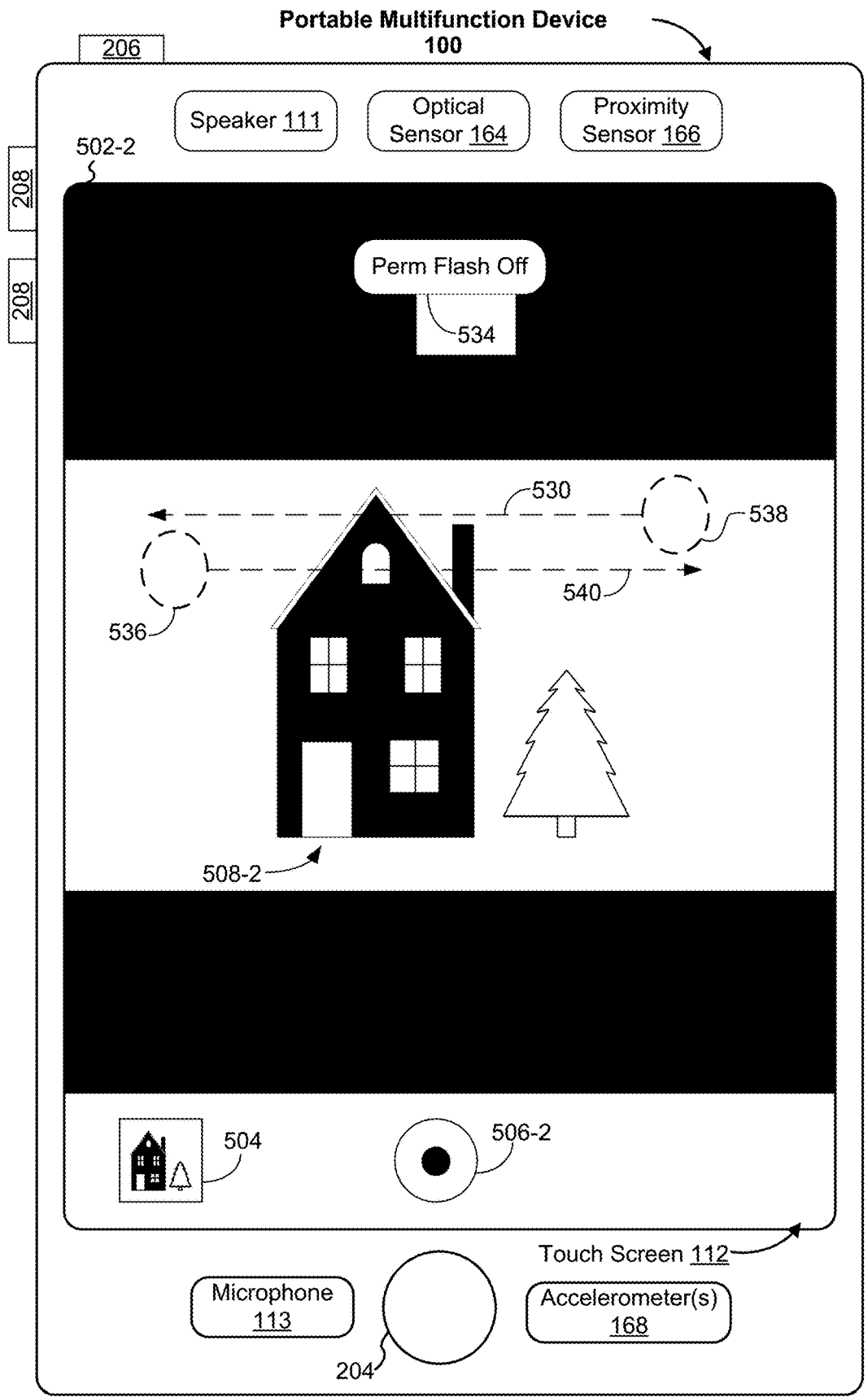

FIG. 5H shows the completion of the animation, with camera interface 502-2 displayed on touch screen 112, replacing camera interface 502-1. Camera interface 502-2 corresponds to a video camera mode or a virtual video camera. Camera interface 502-2 includes camera roll icon 504, shutter (e.g., video recording on/off) button 506-2, camera preview 508-2, and permanent flash control 534. Activation of permanent flash control 534 toggles between turning the flash light off and permanently turning the flash light.

Camera interface 502-1 and camera interface 502-2 captures media with different output dimensions and different aspect ratios. In some embodiments, camera interface 502-1 captures still images with dimensions matching the sensor dimensions of the physical camera sensors on device 100 (e.g., 3264×2448 pixels) and a corresponding aspect ratio (e.g., 4:3), and camera interface 502-2 captures video with dimensions smaller than the sensor dimensions of the physical camera sensors (e.g., smaller than 3264×2448 pixels) and at a different aspect ratio (e.g., 16:9).

Camera previews 508-1 and 508-2, corresponding to camera interfaces 502-1 and 502-2, respectively, include respective visual indications of the output dimensions associated with the respective camera interfaces. For example, camera preview 508-1 (FIG. 5A) is displayed with no letterboxing, indicating that the output dimensions for camera interface 502-1 match the sensor dimensions. Camera preview 508-2 (FIG. 5H) is displayed with letterboxing, indicating that the output dimensions for camera interface 502-2 is smaller than the sensor dimensions.

In some embodiments, camera interface 502-1 includes one or more controls that are not included in camera interface 502-2. In some embodiments, camera interface 502-2 includes one or more controls that are not included in camera interface 502-1. For example, camera interface 502-1 includes HDR control 512 that is not included in camera interface 502-2, and camera interface 502-2 includes permanent flash control 534 that is not included in camera interface 502-1.

FIG. 5H shows a gesture (e.g., a swipe gesture) with contact 536 detected by device 100 on touch screen 112 over camera preview 508-2. The gesture includes contact 536 moving across camera preview 508-2, and not across any displayed affordance for controlling operation of the camera, in direction 540, which is opposite of direction 530. In response to detecting the gesture with contact 536, device 100 switches from camera interface 502-2 back to camera interface 502-1. In some embodiments, an animation similar to the animation depicted in FIGS. 5E-5G, but in the reverse direction as that shown in FIGS. 5E-5G, is displayed for the switch from camera interface 502-2 to camera interface 502-1.

Figure 5I:
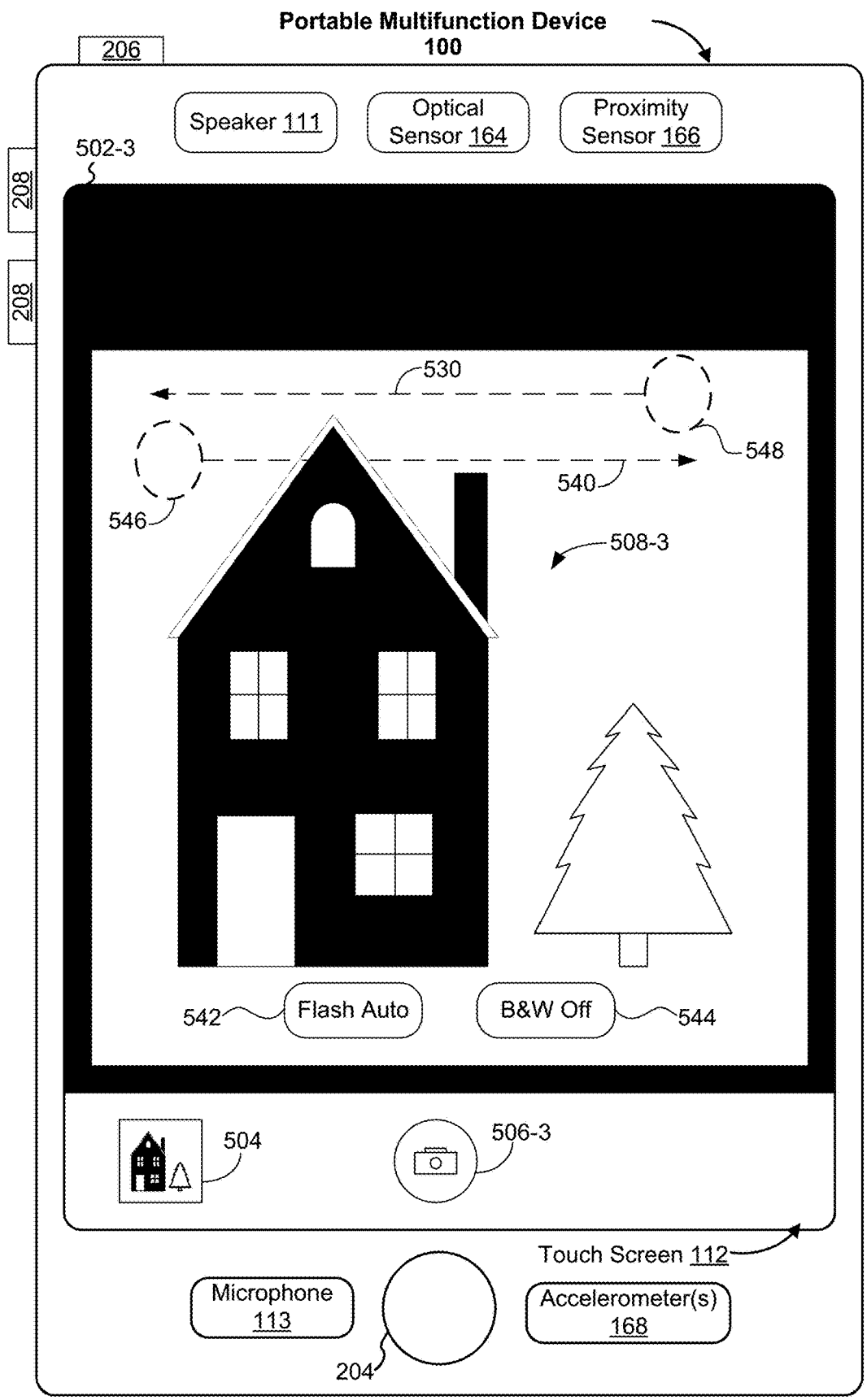

FIG. 5H also shows, alternatively, a gesture (e.g., a swipe gesture) with contact 538 detected by device 100 on touch screen 112 over camera preview 508-2. The gesture includes contact 538 moving across camera preview 508-2, and not across any displayed affordance for controlling operation of the camera, in direction 530. In response to detecting the gesture with contact 538, device 100 switches from camera interface 502-2 to camera interface 502-3 (FIG. 5I). In some embodiments, an animation similar to the animation depicted in FIGS. 5E-5G is displayed for the switch from camera interface 502-2 to camera interface 502-3.

FIG. 5I shows camera interface 502-3 displayed on touch screen 112. Camera interface 502-3 corresponds to a square camera mode or a virtual square camera. Camera interface 502-3 includes camera roll icon 504, shutter button 506-3, camera preview 508-3, flash control 542, and black-and-white control 544. Flash control 542 is the same as flash control 510 (FIG. 5A). Activation of black-and-white control 544 toggles between black-and-white image mode and color image mode. Black-and-white control 544 is not included in camera interface 502-1 or camera interface 502-2.

Camera interfaces 502-1, 502-2, and 502-3 have one or more controls in common. For example, camera roll icon 504 is present in camera interfaces 502-1, 502-2, and 502-3, and is displayed at the same location on touch screen 112 in camera interfaces 502-1, 502-2, and 502-3. Also, each of camera interfaces 502-1, 502-2, and 502-3 includes a shutter button 506 at the same location on touch screen 112, with the visual appearance of shutter button 506 varying depending on the particular interface (e.g., the visual appearance of shutter button 506-2 differs from that of shutter button 506-1 or 506-3).

Camera interface 502-3 captures media with different output dimensions and aspect ratio than camera interfaces 502-1 or 502-2. For example, camera interface 502-3 is associated with smaller output dimensions than the sensor dimensions on device 100, and is associated with a 1:1 aspect ratio. The windowboxing (i.e., having both letterboxing and pillarboxing) demarcating a square camera preview 508-3, as shown in FIG. 5I, provides visual indication of the 1:1 aspect ratio and the smaller output dimensions.

FIG. 5I shows a gesture (e.g., a swipe gesture) with contact 546 detected by device 100 on touch screen 112 over camera preview 508-3. The gesture includes contact 546 moving across camera preview 508-3, and not across any displayed affordance for controlling operation of the camera, in direction 540, which is opposite of direction 530. In response to detecting the gesture with contact 546, device 100 switches from camera interface 502-3 back to camera interface 502-2. In some embodiments, an animation similar to the animation depicted in FIGS. 5E-5G, but in the reverse direction as that shown in FIGS. 5E-5G, is displayed for the switch from camera interface 502-3 to camera interface 502-2.

Figure 5J:
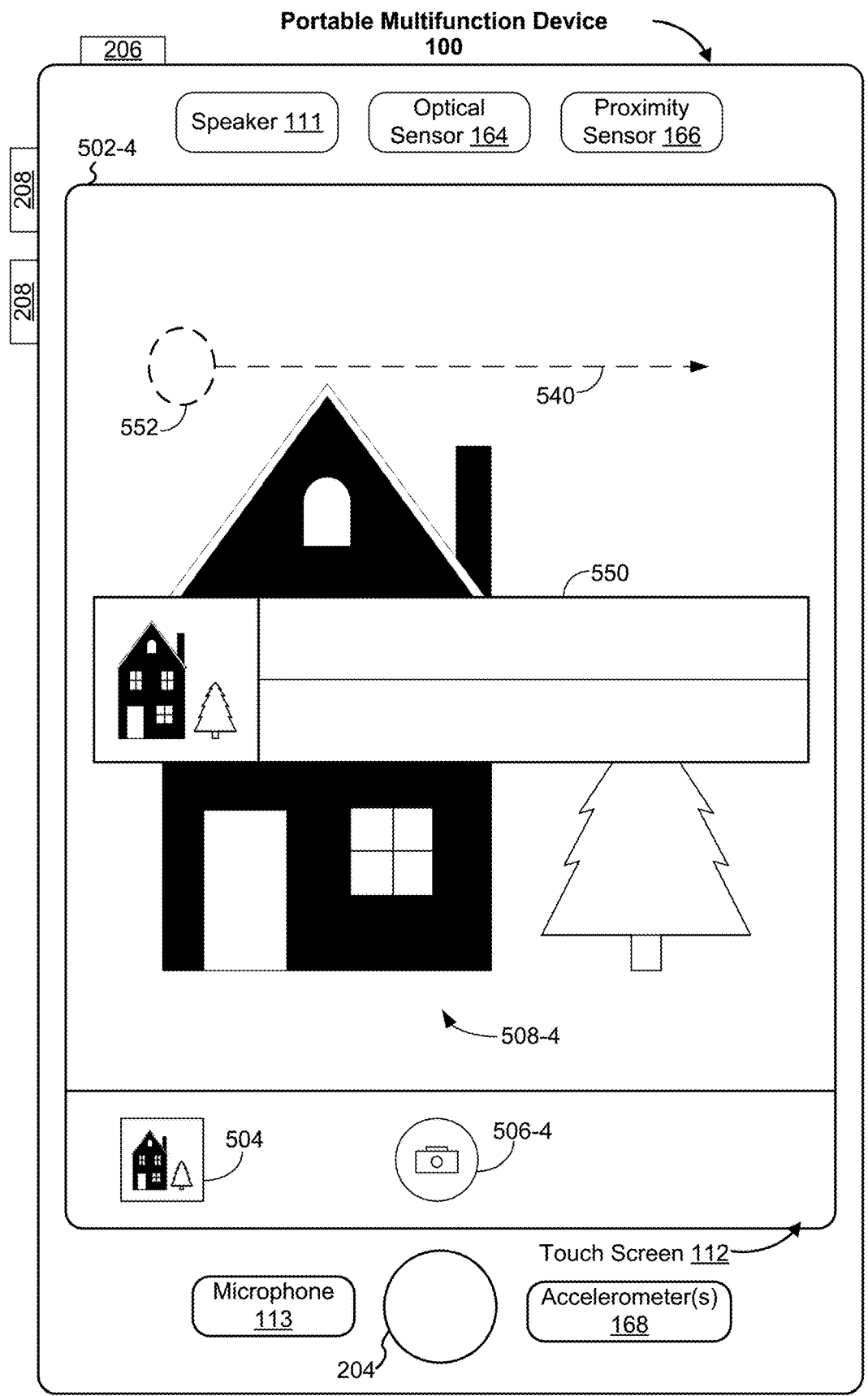

FIG. 5I also shows, alternatively, a gesture (e.g., a swipe gesture) with contact 548 detected by device 100 on touch screen 112 over camera preview 508-3. The gesture includes contact 548 moving across camera preview 508-3, and not across any displayed affordance for controlling operation of the camera, in direction 530. In response to detecting the gesture with contact 548, device 100 switches from camera interface 502-3 to camera interface 502-4 (FIG. 5J). In some embodiments, an animation similar to the animation depicted in FIGS. 5E-5G is displayed for the switch from camera interface 502-3 to camera interface 502-4.

FIG. 5J shows camera interface 502-4 displayed on touch screen 112. Camera interface 502-4 corresponds to a panorama camera mode or a virtual panorama camera. Camera interface 502-4 includes camera roll icon 504, shutter button 506-4, camera preview 508-4, and panorama progress indicator 550. Panorama progress indicator 550 displays the alignment of sequential images for a panorama. Camera interfaces 502-1, 502-2, 502-3 do not include panorama progress indicator 550. Thus, in some embodiments, the output of the panorama camera is a variable size image that depends on how many images were stitched together into the panorama and how much the images overlapped and how much the final panorama image was cropped.

Camera interfaces 502-1, 502-2, 502-3, and 502-4 have one or more controls in common. For example, camera roll icon 504 is present in camera interfaces 502-1, 502-2, 502-3, and 502-4, and is displayed at the same location on touch screen 112 in camera interfaces 502-1, 502-2, 502-3, and 502-4. Also, each of camera interfaces 502-1, 502-2, 502-3, and 502-4 includes a shutter button 506 at the same location on touch screen 112, with the visual appearance of shutter button 506 varying depending on the particular interface (e.g., the visual appearance of shutter button 506-2 differs from that of shutter button 506-1, 506-3, or 506-4).

Camera interface 502-4 captures media with different output dimensions and aspect ratio than camera interfaces 502-1, 502-2, or 502-3. For example, camera interface 502-4 is associated with larger output dimensions than the sensor dimensions on device 100, and is associated with a different aspect ratio than the aspect ratios associated with camera interfaces 502-1, 502-2, and 502-3. Panorama progress indicator 550 provides visual indication of the different aspect ratio and the larger output dimensions.

FIG. 5J shows a gesture (e.g., a swipe gesture) with contact 552 detected by device 100 on touch screen 112 over camera preview 508-4. The gesture includes contact 552 moving across camera preview 508-4, and not across any displayed affordance for controlling operation of the camera, in direction 540, which is opposite of direction 530. In response to detecting the gesture with contact 552, device 100 switches from camera interface 502-4 back to camera interface 502-3. In some embodiments, an animation similar to the animation depicted in FIGS. 5E-5G, but in the reverse direction as that shown in FIGS. 5E-5G, is displayed for the switch from camera interface 502-4 to camera interface 502-3.

Thus, FIGS. 5D-5J illustrate device 100 that switches amongst four camera interfaces 502, in sequence, in response to detecting respective gestures that include movements of contacts across touch screen 112 (e.g., across camera preview 508). It should be appreciated that device 100 can switch between more than four (e.g., five or more) or less that four (e.g., three) camera interfaces 502. Also, the sequence of interfaces 502 shown in FIGS. 5D-5J is merely exemplary, and the interfaces 502 may be ordered in any suitable order.

In some embodiments, device 100 switches between three camera interfaces 502 in response to detecting respective gestures. The three interfaces include, for example, a video camera interface (e.g., interface 502-2) and two different still image camera interfaces (e.g., interface 502-1 and either interface 502-3 or 502-4). In some embodiments, the three interfaces include any three of the following: a rectangular still camera interface (e.g., interface 502-1), a video camera interface (e.g., interface 502-2), a panorama still camera interface (e.g., interface 502-4), a black and white still camera interface, and a square still camera interface (e.g., interface 502-3).

In some embodiments, the sequence of camera interfaces is configured to include three interfaces by default, and additional interfaces beyond the three are included in accordance with user input. For example, the default sequence includes interfaces 502-1, 502-2, and 502-3, and the user can select interface 502-4 for addition to the sequence. Alternatively, the default sequence includes interfaces 502-1, 502-2, and 502-4, and the user can select interface 502-3 for addition to the sequence.

Figure 5K:
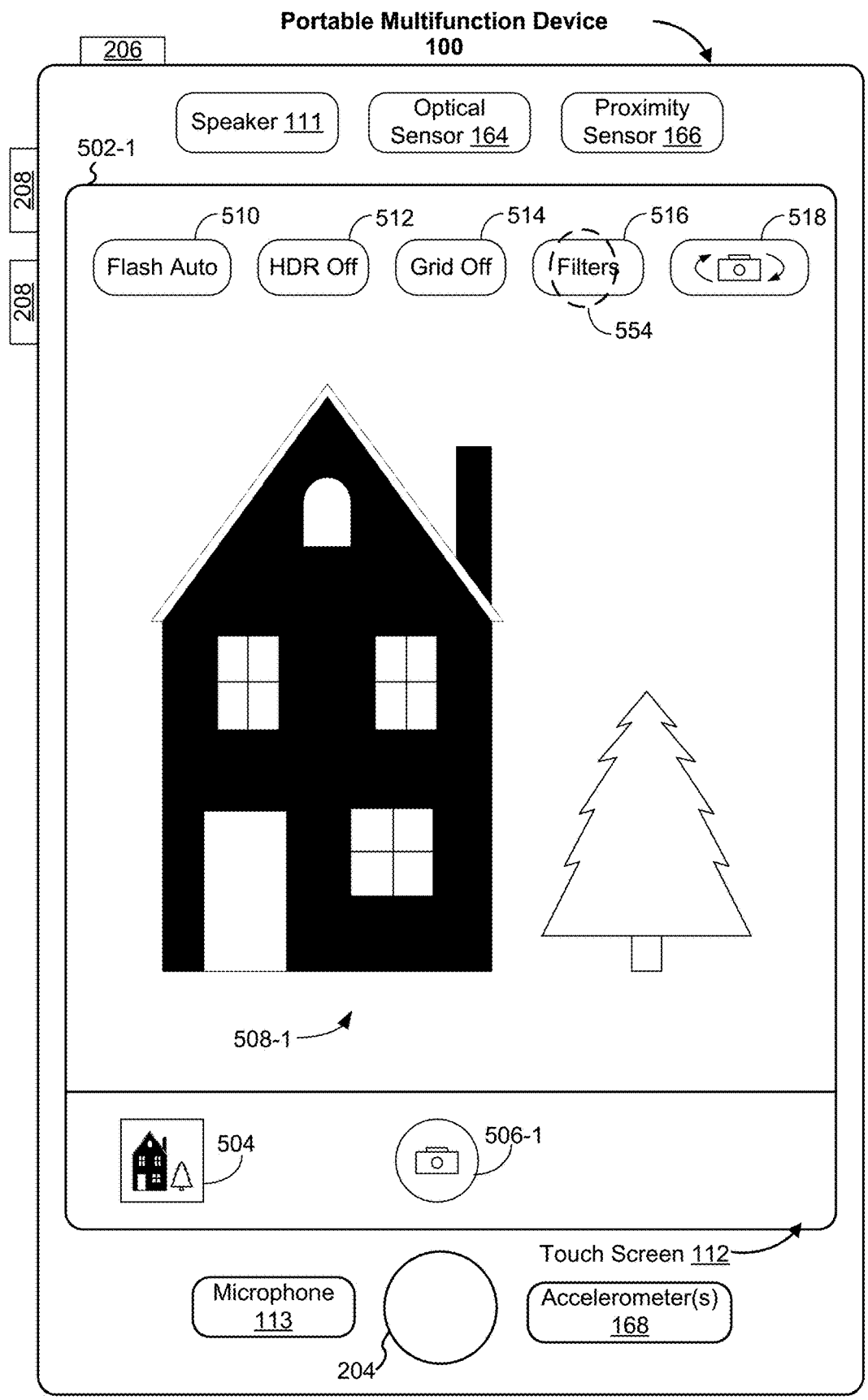
Figure 5L:
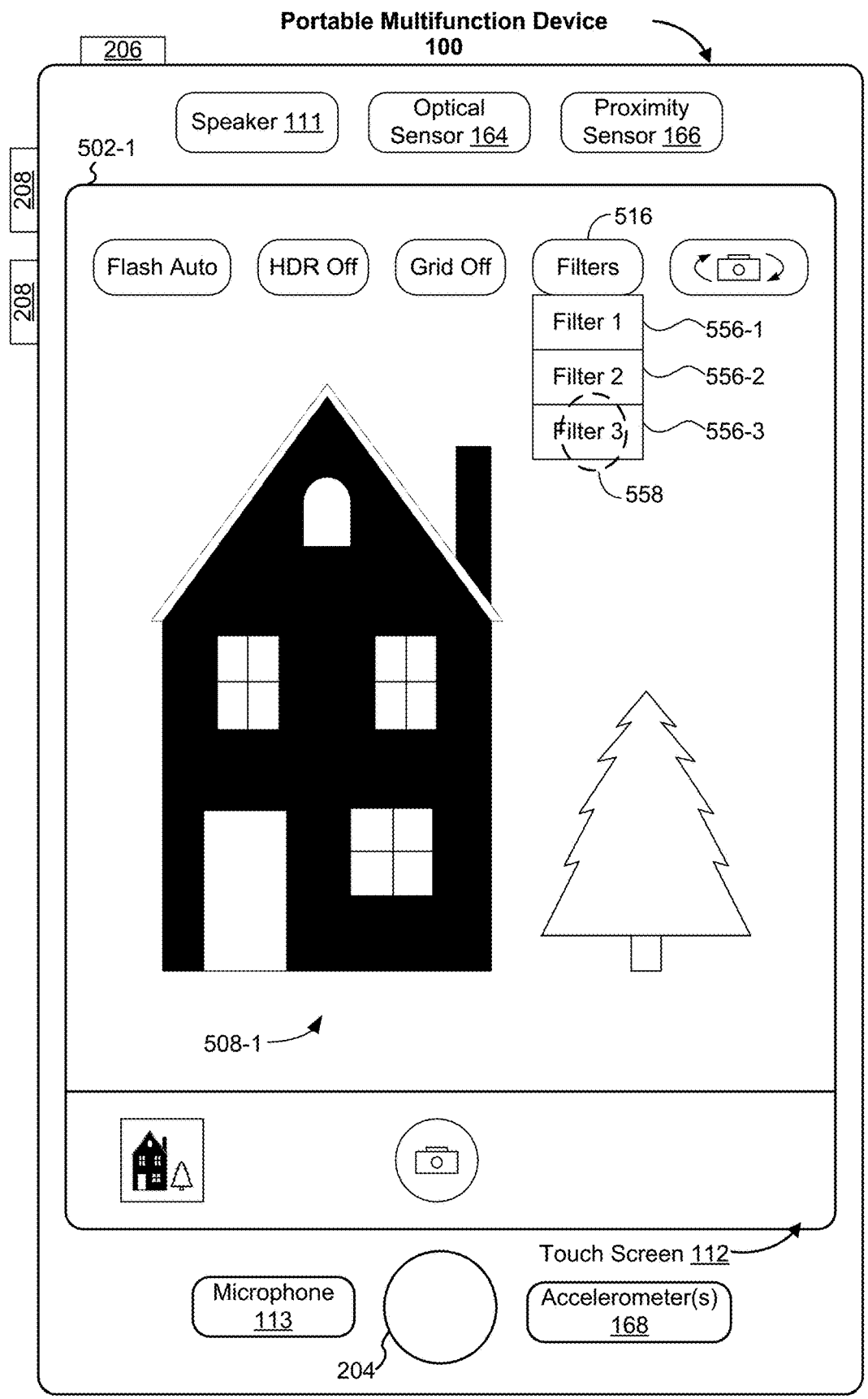

FIG. 5K shows camera interface 502-1, with camera preview 508-1, displayed on touch screen 112, as in FIG. 5A. Device 100 detects contact 554 on filter control 516. In response to detecting contact 554 on filter control 516, device 100 displays filter options 556 on touch screen 112, as shown in FIG. 5L. Filter options 556-1 thru 556-3 correspond to different filters that are applied to media captured by device 100.

Figure 5M:
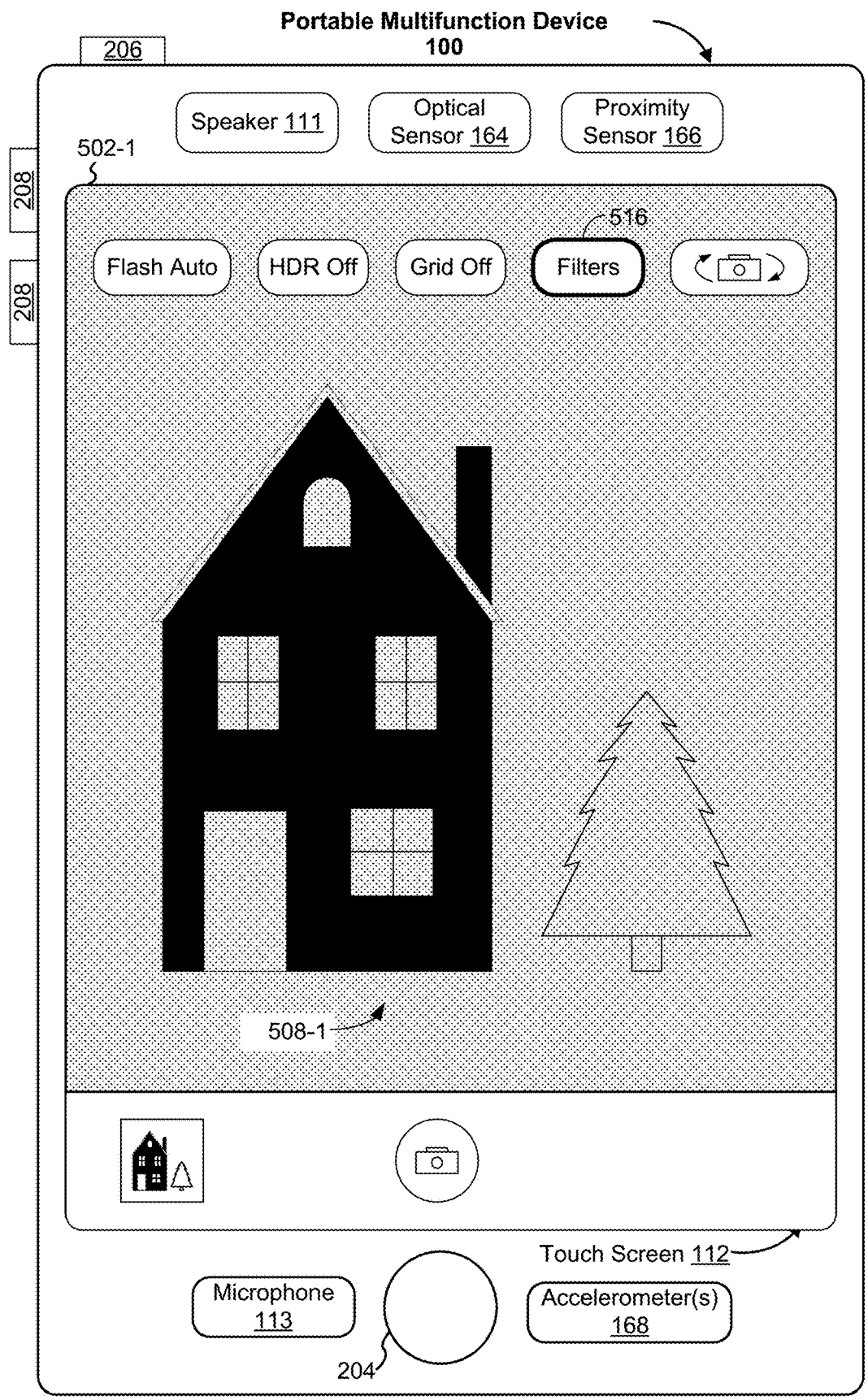
Figure 5N:
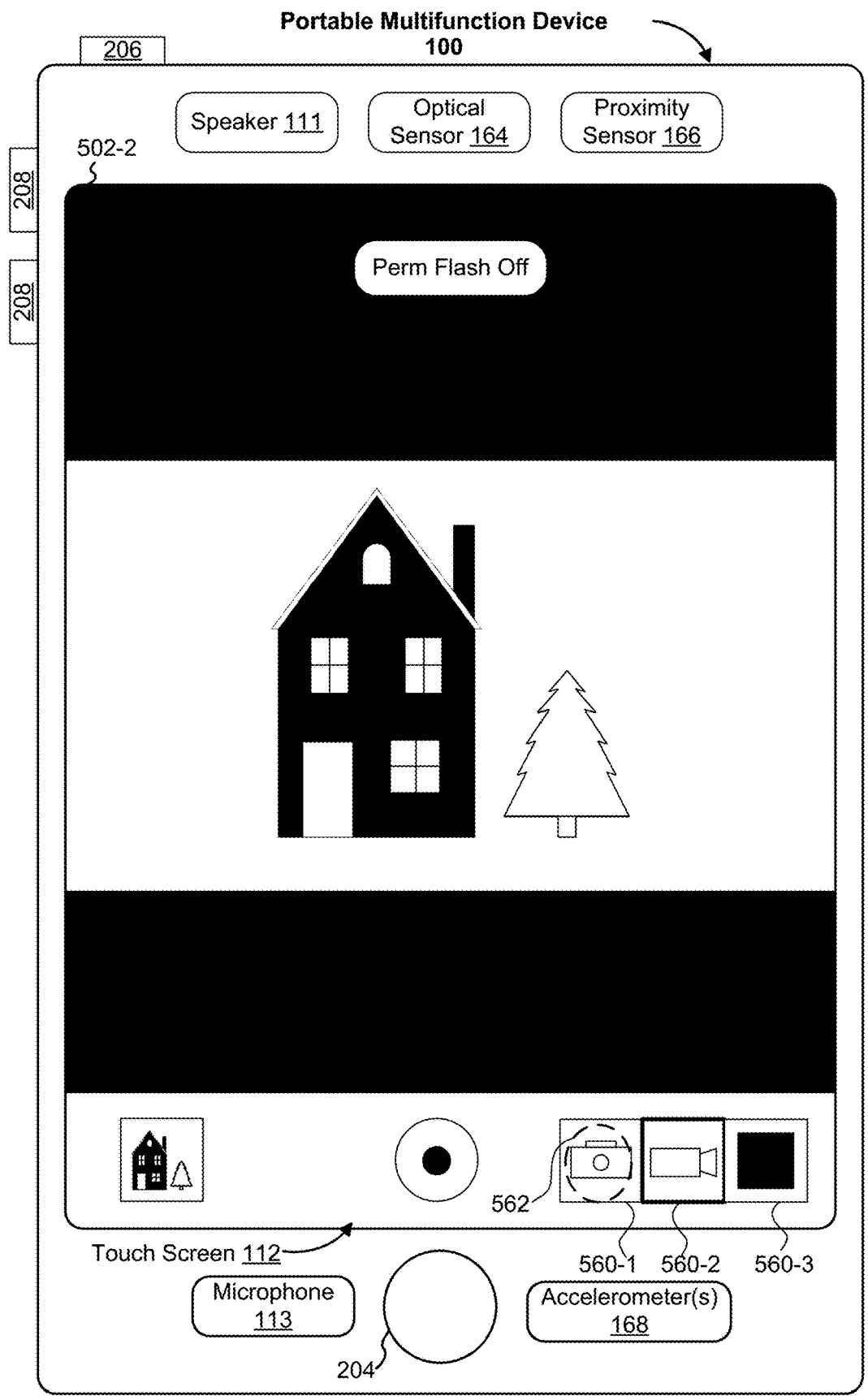
Figure 6A:
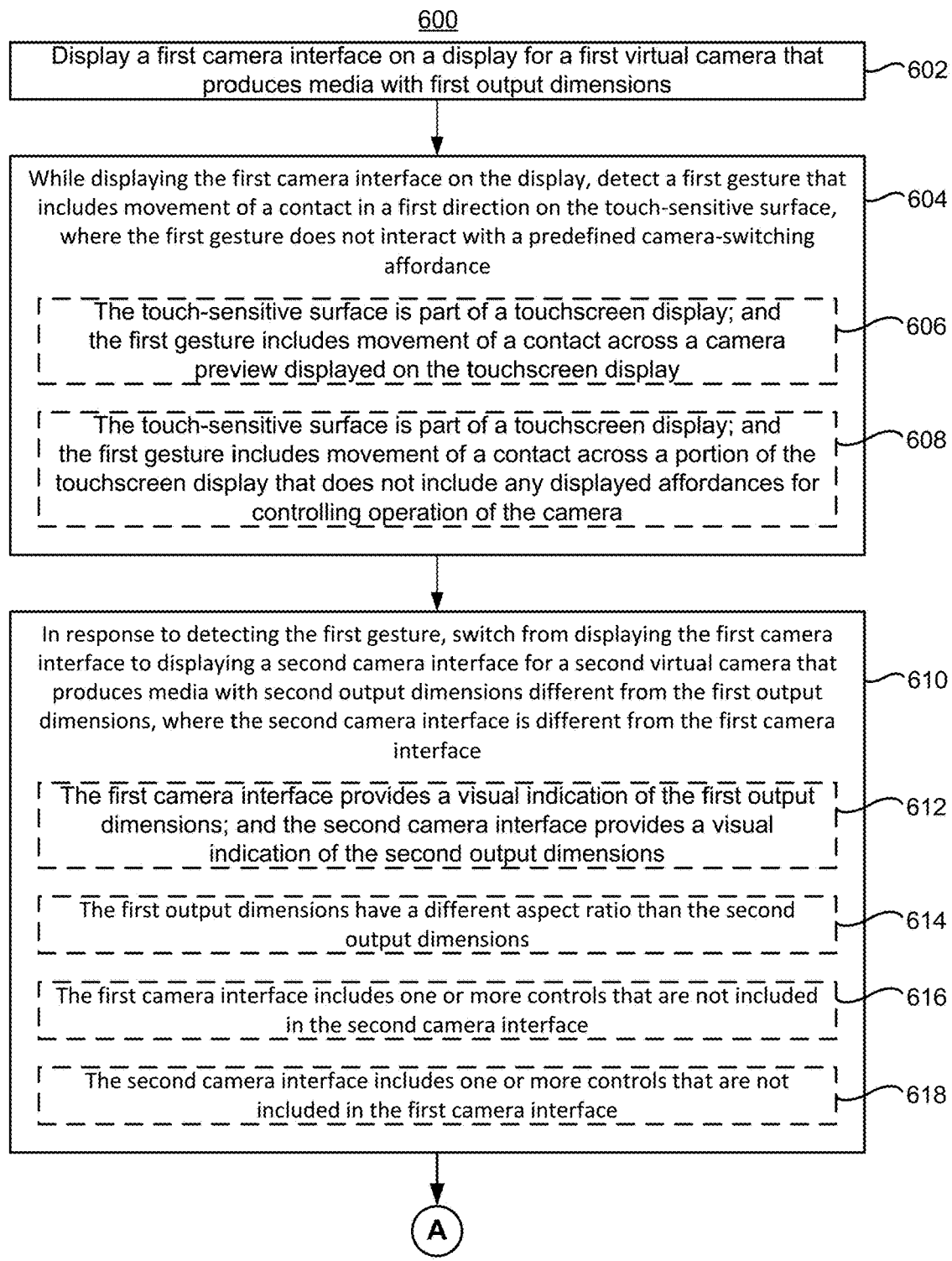
Figure 6B:
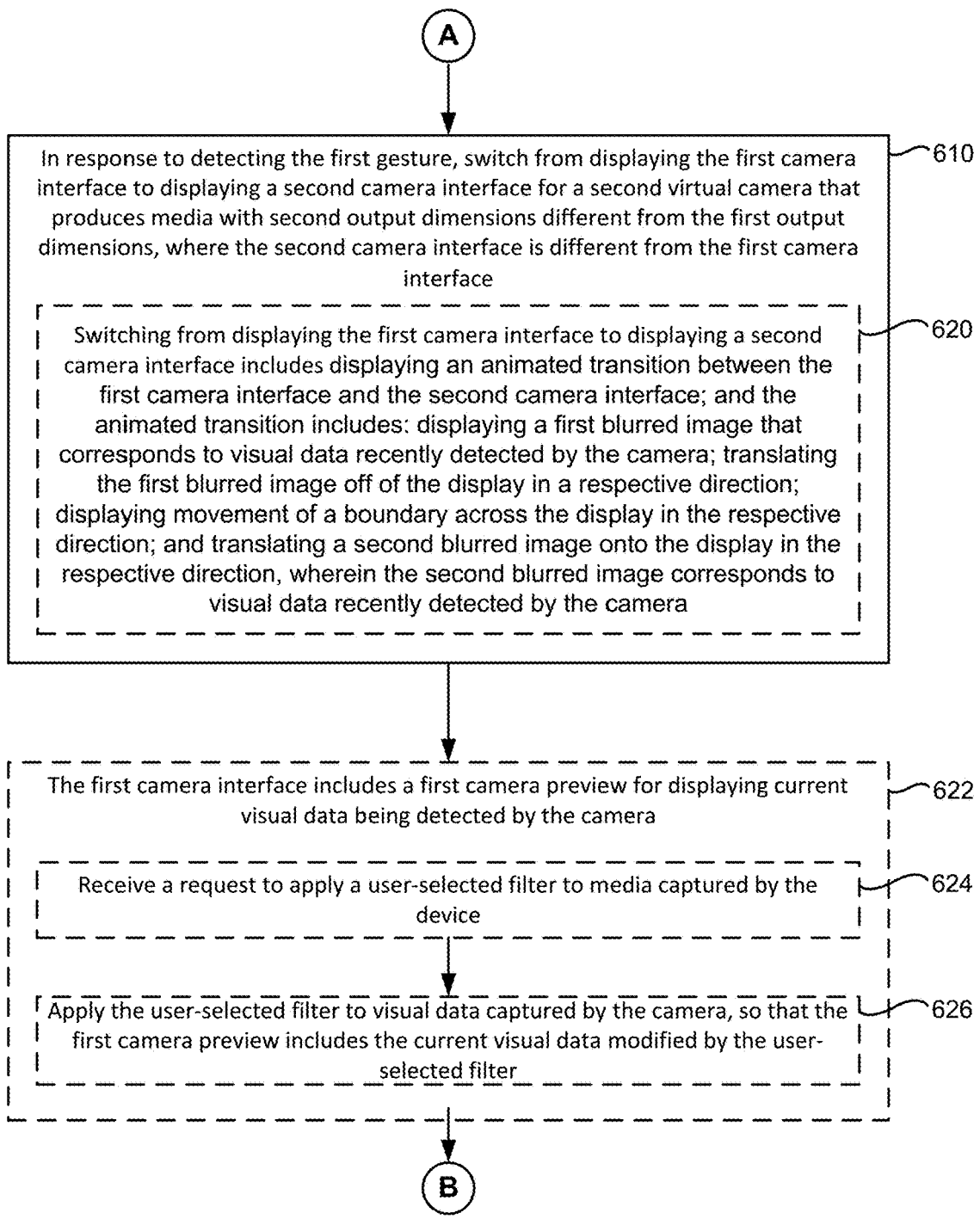
Figure 6C:
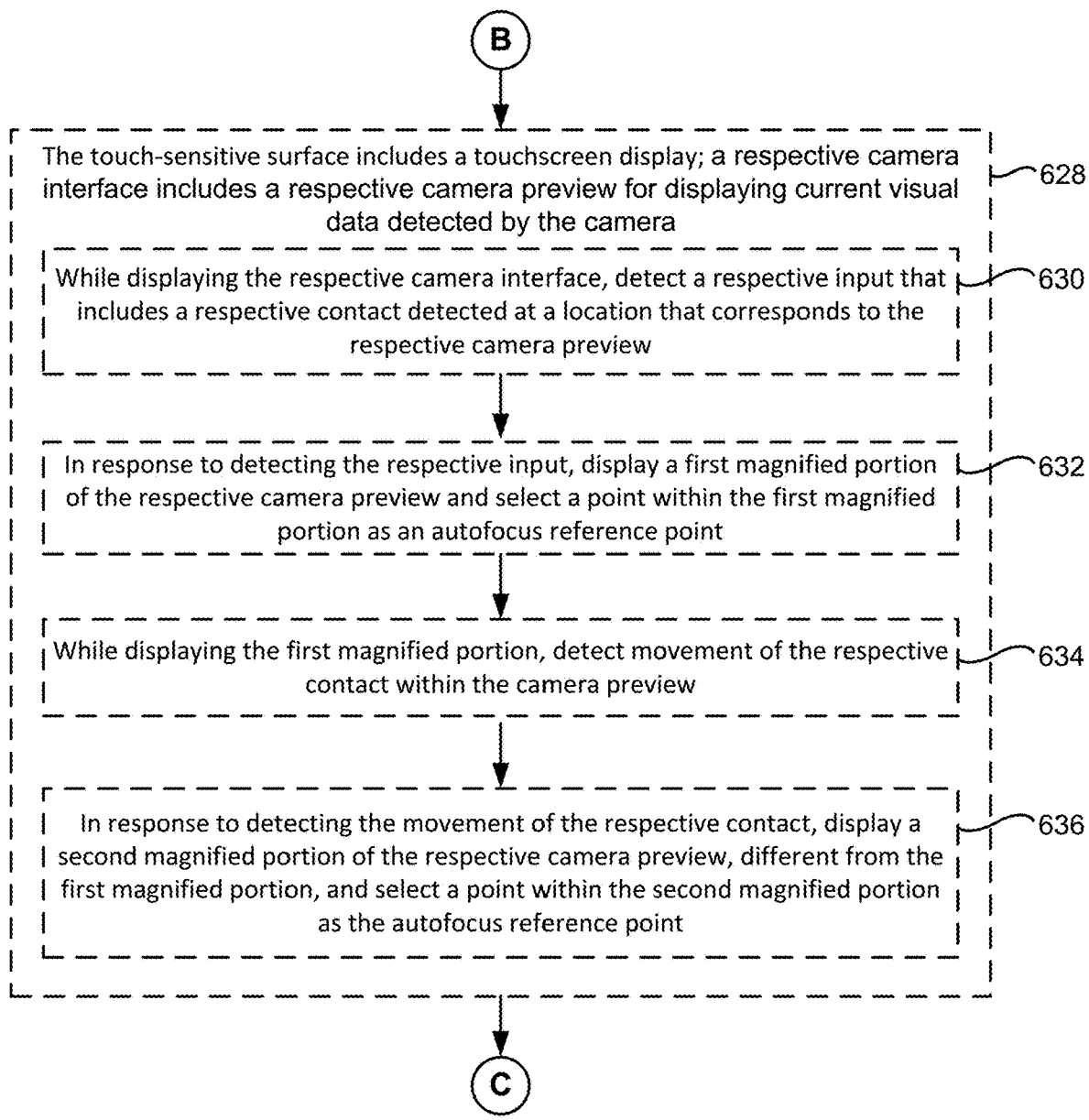
Figure 6D:
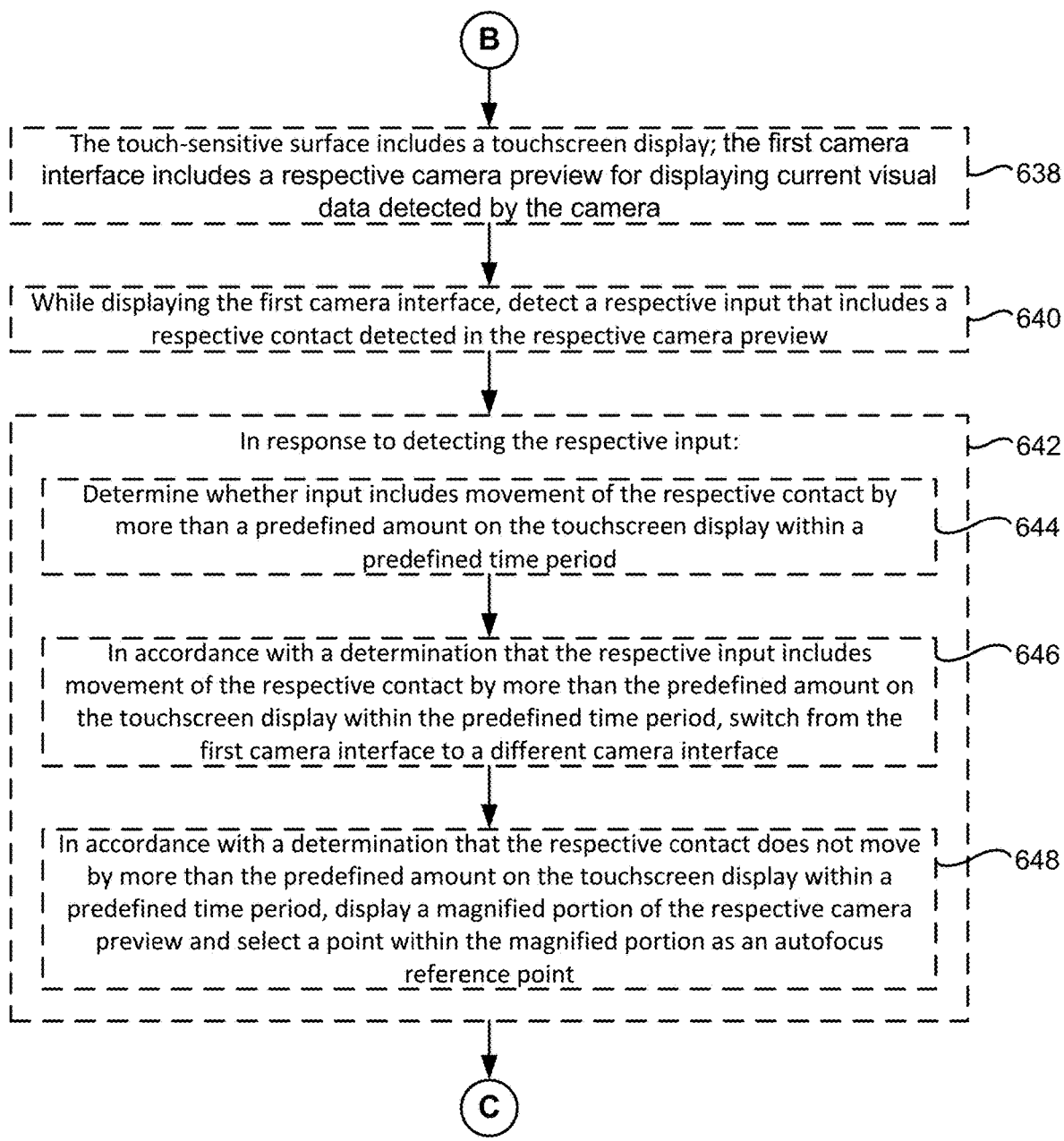
Figure 6E:
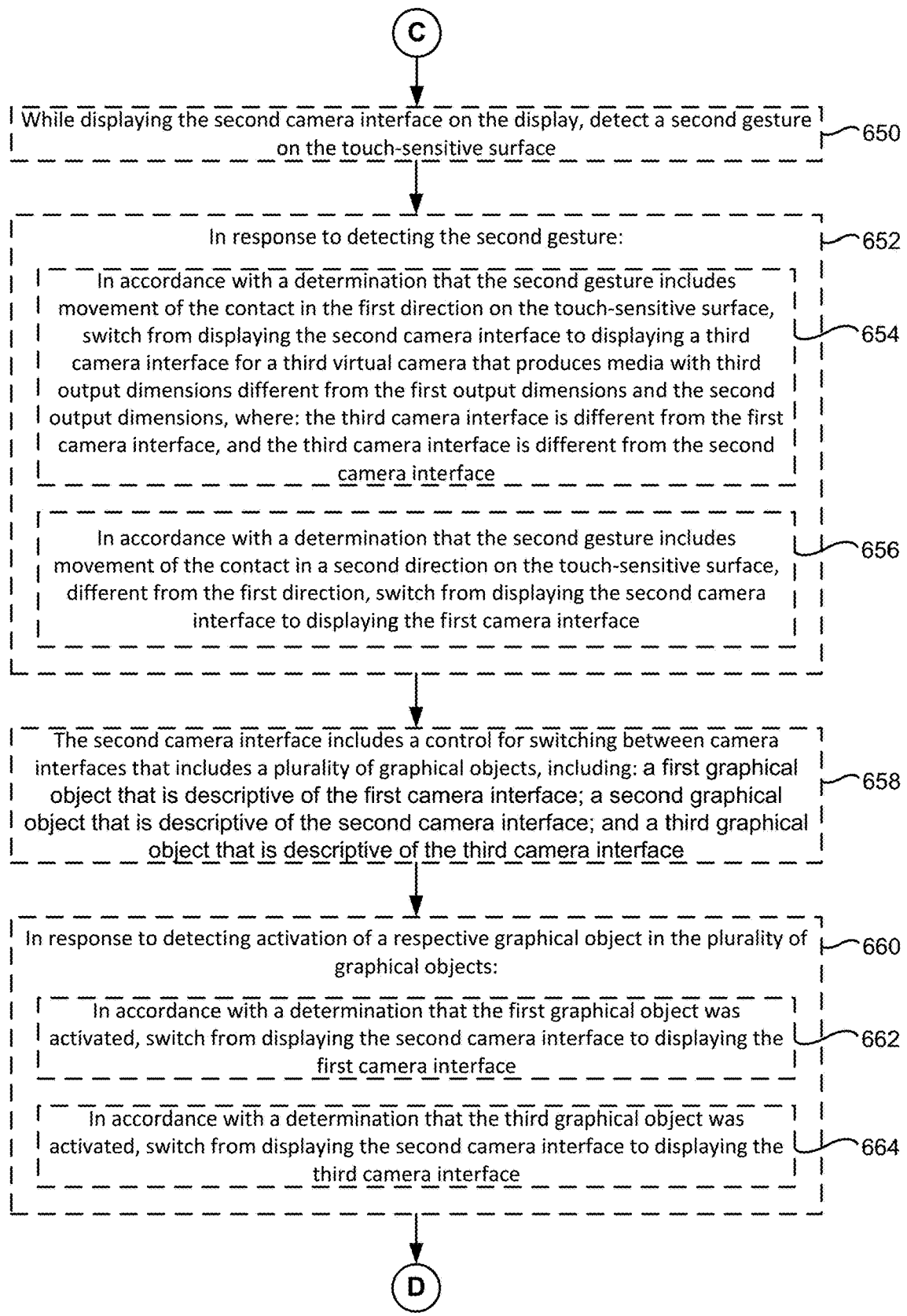
Figure 6F:
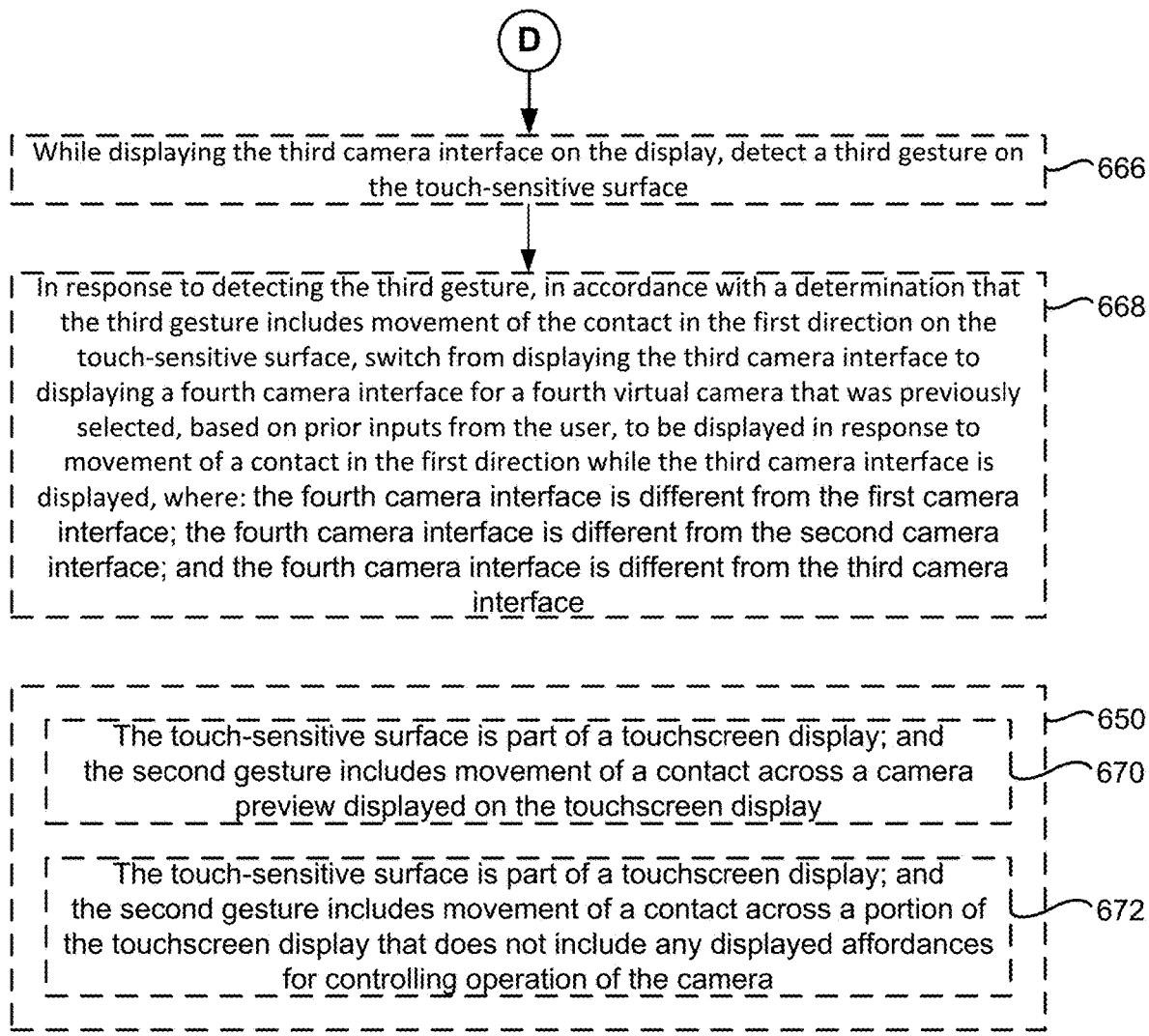

Device 100 detects contact 558 on filter option 556-3. In response to detecting contact 558 on filter option 556-3, the filter corresponding to filter option 556-3 is applied to visual data captured by the camera on device 100. Camera preview 508-1 is displayed with the filter applied, as shown in FIG. 5M, thus giving the user a live preview of the visual appearance of media with the filter applied. Optionally, filter control 516 is highlighted (e.g., with a thicker border) to further indicate that a filter is being applied.

In some embodiments, camera interface switching controls are displayed on touch screen 112, in the respective interfaces. For example, FIG. 5N shows camera interface switching controls 560 displayed on touch screen 112 in camera interface 502-2. Control 560-1 corresponds to interface 502-1, and includes a standard camera icon indicating the correspondence. Control 560-2 corresponds to interface 502-2, and includes a video camera icon indicating the correspondence. Control 560-3 corresponds to interface 502-3, and includes a square icon (for a square camera) indicating the correspondence. Control 560-2 is highlighted (e.g., with a thicker border) to indicate that interface 502-3 is currently displayed on touch screen 112. In response to detecting a respective contact on a respective control 560, device 100 switches from the currently displayed camera interface to the camera interface to which the control 560 over which the contact is detected corresponds. For example, device 100 detects contact 562 on control 560-1. In response to detecting contact 562 over control 560-1, device 100 switches from camera interface 502-2 to camera interface 502-1. Similarly, in response to detecting a contact over control 560-3, device 100 switches from camera interface 502-2 to camera interface 502-3.

FIGS. 6A-6G are flow diagrams illustrating a method 600 of switching between camera interfaces in accordance with some embodiments. The method 600 is performed at an electronic device (e.g., device 300, FIG. 3, or portable multifunction device 100, FIG. 1A) with a display and a touch-sensitive surface. In some embodiments, the display is a touch screen display and the touch-sensitive surface is on the display. In some embodiments, the display is separate from the touch-sensitive surface. Some operations in method 600 are, optionally, combined and/or the order of some operations is, optionally, changed.

As described below, the method 600 provides an intuitive way to switch between camera interfaces. The method reduces the cognitive burden on a user when switching between camera interfaces, thereby creating a more efficient human-machine interface. For battery-operated electronic devices, enabling a user to switch between camera interfaces faster and more efficiently conserves power and increases the time between battery charges.

The device displays (602) a first camera interface on the display for a first virtual camera that produces media with first output dimensions (e.g., dimensions of the media in pixels such as 3264×2448 pixels). For example, FIGS. 5A and 5D show camera interface 502-1 displayed on touch screen 112. Camera interface 502-1 corresponds to a virtual standard camera that captures still images with certain output dimensions.

While displaying the first camera interface on the display, the device detects (604) a first gesture that includes movement of a contact in a first direction on the touch-sensitive surface, where the first gesture does not interact with a predefined camera-switching affordance. In some embodiments, the first camera interface does not include a predefined camera-switching affordance. In some embodiments, the first camera interface includes a predefined camera-switching affordance but the first gesture corresponds to a location of the first camera interface that does not include (e.g., is remote from) the predefined camera-switching affordance. Device 100 detects a gesture with contact 528 moving in direction 530, as shown in FIG. 5D for example. The gesture does not interact with any camera-switching affordance (e.g., camera interface switching controls 560 (FIG. 5N)).

In some embodiments, the touch-sensitive surface is part of a touchscreen display, and the first gesture includes movement of a contact across a camera preview displayed on the touchscreen display (606). For example, the gesture with contact 528 moves across touch screen 112 over camera preview 508-1 (FIG. 5D).

In some embodiments, the touch-sensitive surface is part of a touchscreen display, and the first gesture includes movement of a contact across a portion of the touchscreen display that does not include any displayed affordances for controlling operation of the camera (608). For example, the gesture with contact 528 moves across touch screen 112 over camera preview 508-1 (FIG. 5D), and does not move over any displayed affordance for controlling operation of the camera (e.g., camera roll icon 504; shutter button 506-1; controls 510, 512, 514, 516, and 518).

In response to detecting the first gesture, the device switches (610) from displaying the first camera interface to displaying a second camera interface for a second virtual camera that produces media with second output dimensions different from the first output dimensions, where the second camera interface is different from the first camera interface. In some embodiments, the first camera interface includes at least one respective control not displayed in the second camera interface, the second camera interface includes at least one respective control not displayed in the first camera interface, and/or a media preview has a different appearance in the first camera interface than in the second camera interface. In some embodiments, the one respective control that is different between the first camera interface and the second camera interface includes a hardware camera selection button (e.g., front camera vs back camera) an image capture options button, a filter selection button, or a flash toggle button. In response to detecting the gesture with contact 528, device 100 switches from camera interface 502-1 (FIG. 5D) to camera interface 502-2 (FIG. 5H). Camera interface 502-2 corresponds to a virtual video camera and is associated with different output dimensions than camera interface 502-1.

In some embodiments, the first camera interface provides (612) a visual indication of the first output dimensions (e.g., a full screen display of camera preview for a standard still camera), and the second camera interface provides a visual indication of the second output dimensions (e.g., a letter-boxed camera preview for a square camera or a video camera). For example, camera preview 508-1 in camera interface 502-1 is a full-screen preview, and camera preview 508-2 in camera interface 502-2 is a letterboxed camera preview.

In some embodiments, the first output dimensions have (614) a different aspect ratio than the second output dimensions. For example, the aspect ratio associated with camera interface 502-1 is 4:3, and the aspect ratio associated with camera interface 502-2 is 16:9.

In some embodiments, the first camera interface includes (616) one or more controls that are not included in the second camera interface (and, optionally, a third camera user interface) (e.g., still camera display options or still image capture options such as high dynamic range or "HDR" images that are not available for a video camera or a panorama camera, etc.). For example, camera interface 502-1 includes HDR control 512 that is not included in camera interfaces 502-2, 502-3, or 502-4.

In some embodiments, the second camera interface includes (618) one or more controls that are not included in the first camera interface (and, optionally, the third camera user interface) (e.g., a control for permanently turning on the flash). For example, camera interface 502-2 includes permanent flash control 534 that is not included in camera interface 502-1, 502-3, or 502-4.

In some embodiments, switching from displaying the first camera interface to displaying a second camera interface includes displaying (620) an animated transition between the first camera interface and the second camera interface. The animated transition includes displaying a first blurred image that corresponds to visual data recently detected by the camera, translating the first blurred image off of the display in a respective direction, displaying movement of a boundary across the display in the respective direction, and translating a second blurred image onto the display in the respective direction, where the second blurred image corresponds to visual data recently detected by the camera. In some embodiments, the respective direction corresponds to a direction of movement of the contact on the touch-sensitive surface during the first gesture. In some embodiments, the boundary is curved so as to simulate the movement of an interchangeable lens over the camera sensor. In some embodiments, the first and second blurred image correspond to the same visual data (e.g., data captured with the camera prior to switching camera user interfaces), because the camera is switching between different "modes" and is thus not available to capture visual data corresponding to the mode of operation associated with the second camera interface. In some embodiments, a similar animation is displayed when switching from the second camera interface to a third, different, camera interface (e.g., a camera interface for a panorama camera). In some embodiments, the animated transition includes displaying a shutter button for the first camera interface transitioning to a shutter button for the second camera interface (e.g., a red shutter button for a video camera interface sliding in to replace a gray or silver shutter button for a still camera interface).

For example, FIGS. 5D-5H show a switch from camera interface 502-1 to camera interface 502-1 that includes an animation. The animation includes blurred image 532-1, corresponding to camera interface 502-1, translating off of touch screen 112 in direction 530, and blurred image 532-2, corresponding to camera interface 502-2, translating onto touch screen 112 in direction 530.

In some embodiments, the first camera interface includes a first camera preview for displaying current visual data being detected by the camera (622). The device receives (624) a request to apply a user-selected filter to media captured by the device, and applies (626) the user-selected filter to visual data captured by the camera, so that the first camera preview includes the current visual data modified by the user-selected filter. In some embodiments, the user-selected filter is applied to an image or video in response to receiving a request to capture media (e.g., video or a still image while the user-selected filter is selected and is being applied to the camera preview). In some embodiments, the user-selected filter is selected while a prior filter (or no filter) is selected, and the device ceases to display the current visual data modified by the prior filter and starts to display the current visual data modified by the user-selected filter (e.g., the filter is a "live" filter that is applied "live" to a preview of the camera output). In some embodiments, the filter is a non-destructive filter that can later be removed from the image (e.g., the image data captured by the camera is stored separately from a respective stack of image processing operations that are performed on the image data, and the respective stack of image processing operations can be removed and replaced with a different stack of image processing operations to remove the filter and/or apply a different filter in response to a user request to remove the filter and/or apply a different filter).

For example, FIGS. 5K-5L shows device 100 receiving a request (in the form of contact 558 on filter option 556-3) to apply a filter corresponding to filter option 556-3. In response to receiving the request, device 100 applies the filter to visual data captured by the camera; camera preview 508-1 is displayed with the filter applied, as shown in FIG. 5M.

In some embodiments, the touch-sensitive surface includes a touchscreen display, and a respective camera interface includes a respective camera preview for displaying current visual data detected by the camera (628). While displaying the respective camera interface, the device detects (630) a respective input that includes a respective contact detected at a location that corresponds to the respective camera preview (e.g., a touch and hold input corresponding to a respective contact detected on the touchscreen display). In response to detecting the respective input, displaying (632) a first magnified portion of the respective camera preview and selecting a point within the first magnified portion as an autofocus reference point. Displaying the first magnified portion (e.g., an "autofocus loupe") enables a user to more accurately select an autofocus reference point in the camera preview. For example, FIG. 5A shows a tap-and-hold gesture with contact 520 detected on touch screen 112 over camera preview 508-1. In response to detecting the gesture, a zoomed-in portion of camera preview 508-1 is displayed in autofocus loupe 522 on touch screen 112, and point 524-1 in the zoom-in portion is selected as the autofocus reference point.

In some embodiments, while displaying the first magnified portion, the device detects (634) movement of the respective contact within the camera preview. In response to detecting the movement of the respective contact, the device displays (636) a second magnified portion of the respective camera preview, different from the first magnified portion, and selecting a point within the second magnified portion as the autofocus reference point. For example, in response to detecting movement of contact 520 from location 520-a to location 520-b while autofocus loupe 522 is displayed, device 100 displays autofocus loupe 522 at location 522-b, and the zoomed-in portion displayed within autofocus loupe 522 the zoomed-in portion of camera preview 508-1 in the vicinity of contact 520 at location 520-b. Point 524-2 in the zoomed-in portion is selected as the new autofocus reference point.

In some embodiments, the touch-sensitive surface includes a touchscreen display, and the first camera interface includes a respective camera preview for displaying current visual data detected by the camera (638). While displaying the first camera interface, the device detects (640) a respective input that includes a respective contact detected in the respective camera preview. In response to detecting the respective input (642), the device determines (644) whether input includes movement of the respective contact by more than a predefined amount on the touchscreen display within a predefined time period. In accordance with a determination that the respective input includes movement of the respective contact by more than the predefined amount on the touchscreen display within the predefined time period (e.g., the contact moves within 0.1, 0.2, 0.5 seconds or some other reasonable time period), the device switches (646) from the first camera interface to a different camera interface (e.g., displaying different camera interface in response to detecting a swipe gesture). In accordance with a determination that the respective contact does not move by more than the predefined amount on the touchscreen display within a predefined time period (e.g., the contact is stationary or substantially stationary for 0.1, 0.2, 0.5 seconds or some other reasonable time period), the device displays a magnified portion of the respective camera preview and selecting a point within the magnified portion as an autofocus reference point (e.g., displaying an autofocus loupe in response to detecting a touch and hold gesture). For example, FIGS. 5A and 5D show contacts 520 and 528, respectively, detected on touch screen 112 over camera preview 508-1. Contact 520 is substantially stationary for a predefined time period from contact with touch screen 112. Contact 528 moves within the predefined time period from contact with touch screen 112. In response to detecting contact 520, autofocus loupe 522 is displayed and point 524-1 is selected as an autofocus reference point (FIG. 5B). In response to detecting contact 528 and its movement, device 100 switches from camera interface 502-1 to camera interface 502-2.

In some embodiments, while displaying the second camera interface on the display, the device detects (650) a second gesture on the touch-sensitive surface. In response to detecting the second gesture (652), in accordance with a determination that the second gesture includes movement of the contact in the first direction on the touch-sensitive surface, the device switches (654) from displaying the second camera interface to displaying a third camera interface for a third virtual camera that produces media with third output dimensions different from the first output dimensions and the second output dimensions (e.g., replacing display of the second camera interface with the third camera interface), where the third camera interface is different from the first camera interface (e.g., the third camera interface includes at least one respective control not displayed in the first camera interface, the third camera interface includes at least one respective control not displayed in the first camera interface, and/or a media preview has a different appearance in the first camera interface than in the third camera interface), and the third camera interface is different from the second camera interface (e.g., the third camera interface includes at least one respective control not displayed in the second camera interface, the third camera interface includes at least one respective control not displayed in the second camera interface, and/or a media preview has a different appearance in the second camera interface than in the third camera interface). FIG. 5H shows, while camera interface 502-2 is displayed, a gesture is detected on touch screen 112. The gesture includes contact 538 moving on touch screen 112 in direction 530, over camera preview 508-2. In response to detecting the gesture, device 100 switches from camera interface 502-2 to camera interface 502-3 (FIG. 5I). Camera interface 502-3 is different from camera interface 502-1 and camera interface 502-2.

In some embodiments, in response to detecting the second gesture (652), in accordance with a determination that the second gesture includes movement of the contact in a second direction on the touch-sensitive surface, different from the first direction (e.g. opposite to the first direction), the device switches (656) from displaying the second camera interface to displaying the first camera interface (e.g., replacing display of the second camera interface with the first camera interface). FIG. 5H shows, while camera interface 502-2 is displayed, a gesture is detected on touch screen 112. The gesture includes contact 536 moving on touch screen 112 in direction 540, over camera preview 508-2. In response to detecting the gesture, device 100 switches from camera interface 502-2 to camera interface 502-1 (FIG. 5D).

In some embodiments, the second camera interface includes a control for switching between camera interfaces that includes a plurality of graphical objects, including: a first graphical object that is descriptive of the first camera interface, a second graphical object that is descriptive of the second camera interface, and a third graphical object that is descriptive of the third camera interface (658).

In response to detecting activation of a respective graphical object in the plurality of graphical objects (660), in accordance with a determination that the first graphical object was activated, the device switches (662) from displaying the second camera interface to displaying the first camera interface; and in accordance with a determination that the third graphical object was activated, switches (664) from displaying the second camera interface to displaying the third camera interface. In some embodiments, a similar control for switching between the camera interfaces is displayed in the first camera interface and the third camera interface. In some embodiments, the graphical objects change position in accordance with a currently displayed camera interface (e.g., the graphical object corresponding to the currently displayed camera interface is displayed in a middle of the control; a graphical object corresponding to a camera interface that would be displayed in response to a swipe gesture from right-to-left is displayed on a right side of the control; and a graphical object corresponding to a camera interface that would be displayed in response to a swipe gesture from left-to-right is displayed on a left side of the control. For example, in FIG. 5N, camera interface 502-2 includes optionally displayed camera interface switching controls 560. Control 560-1 corresponds to camera interface 502-1. Control 560-2 corresponds to camera interface 502-2. Control 560-3 corresponds to camera interface 502-3. Device 100 switches to camera interface 502-1 in response to detection of contact 562 on control 560-1. Device 100 switches to camera interface 502-3 in response to detection of a contact on control 560-3.

In some embodiments, while displaying the third camera interface on the display, the device detects (666) a third gesture on the touch-sensitive surface. In response to detecting the third gesture, in accordance with a determination that the third gesture includes movement of the contact in the first direction on the touch-sensitive surface, the device switches (668) from displaying the third camera interface to displaying a fourth camera interface for a fourth virtual camera that was previously selected, based on prior inputs from the user, to be displayed in response to movement of a contact in the first direction while the third camera interface is displayed (e.g., the device replaces display of the third camera interface with the fourth camera interface for a user-selected virtual camera that was previously selected from a plurality of candidate virtual cameras that are not in a set of quick-access virtual cameras that are accessible by swiping on the touch-sensitive surface) In some embodiments, the fourth camera interface is an interface for a fourth virtual camera that produces media with fourth output dimensions different from the first, second, and third output dimensions (e.g., a square virtual camera), where: the fourth camera interface is different from the first camera interface (e.g., the fourth camera interface includes at least one respective control not displayed in the first camera interface, the fourth camera interface includes at least one respective control not displayed in the first camera interface, and/or a media preview has a different appearance in the first camera interface than in the fourth camera interface), the fourth camera interface is different from the second camera interface (e.g., the fourth camera interface includes at least one respective control not displayed in the second camera interface, the fourth camera interface includes at least one respective control not displayed in the second camera interface, and/or a media preview has a different appearance in the second camera interface than in the fourth camera interface), and the fourth camera interface is different from the third camera interface (e.g., the fourth camera interface includes at least one respective control not displayed in the third camera interface, the fourth camera interface includes at least one respective control not displayed in the third camera interface, and/or a media preview has a different appearance in the third camera interface than in the fourth camera interface).

FIG. 5I shows, while camera interface 502-3 is displayed, a gesture is detected on touch screen 112. The gesture includes contact 548 moving on touch screen 112 in direction 530, over camera preview 508-3. In response to detecting the gesture, device 100 switches from camera interface 502-3 to camera interface 502-4 (FIG. 5J). Camera interface 502-4 is different from camera interfaces 502-1, 502-2, and 502-3. Camera interface 502-4 was added to the sequence of camera interfaces by the user.

In some embodiments, the device provides quick access to a set of quick-access virtual cameras, where the user is enabled to switch through the quick-access cameras by performing one or more repetitions of a simple gesture on the touch-sensitive surface (e.g., a swipe gesture). In some embodiments, the device includes one or more standard or default virtual cameras in the set of quick-access virtual cameras. For example, the device includes an "ordinary" oblong rectangular still camera, a video camera and a panorama camera in the set of quick-access virtual cameras by default. In some embodiments, a user is enabled to select one or more additional user-selected virtual cameras as quick access cameras from a set of candidate virtual cameras that are not included in the standard or default quick-access virtual cameras. In some embodiments, one or more user-selected virtual cameras are added to the set of quick-access virtual cameras in addition to the standard or default cameras in the set of quick-access virtual cameras (e.g., a square camera and a black and white camera are added to the set of quick-access virtual cameras). In some embodiments, one or more of user-selected virtual cameras replace one or more of the standard or default cameras in the set of quick-access virtual cameras (e.g., a user selects a square camera to replace the panorama camera in the set of quick-access virtual cameras). In some embodiments, the non-selected candidate virtual cameras are still accessible to the user, but a multi-step set of different inputs is used to access the non-selected candidate virtual cameras (e.g., navigating through a series of menus to identify and select a respective non-selected candidate virtual camera). In some embodiments, the set of quick-access virtual cameras has a maximum size (e.g., 3, 4, 5 or 6 virtual cameras), and the set of candidate virtual cameras includes more candidate virtual cameras (e.g., 10, 15 or 20 virtual cameras) than the maximum size of the set of quick-access virtual cameras and thus there are some candidate virtual cameras that are not included in the set of quick-access virtual cameras. Thus, in some embodiments, the user is able to swipe to select between one or more standard or default virtual cameras as well as one or more user-selected virtual cameras rather than being forced to navigate through a complicated set of menus to identify and select virtual cameras that are not standard or default virtual cameras.

In some embodiments, the touch-sensitive surface is part of a touchscreen display, and the second gesture includes movement of a contact across a camera preview displayed on the touchscreen display (670). For example, the gesture with contact 538 moves across touch screen 112 over camera preview 508-2 (FIG. 5H).

In some embodiments, the touch-sensitive surface is part of a touchscreen display, and the second gesture includes movement of a contact across a portion of the touchscreen display that does not include any displayed affordances for controlling operation of the camera (672). For example, the gesture with contact 538 moves across touch screen 112 over camera preview 508-2 (FIG. 5H), and does not move over any displayed affordance for controlling operation of the camera (e.g., camera roll icon 504; shutter button 506-2; control 534).

In some embodiments, the third camera interface provides (674) a visual indication of the third output dimensions (e.g., a panorama progress indicator for aligning sequential images in a panorama and that shows progress toward capturing images that can be used to generate a panoramic image). For example, FIG. 5I shows windowboxing on camera preview 508-3. FIG. 5J shows panorama progress indicator 550 displayed with camera interface 502-4.

In some embodiments, the third output dimensions have (676) a different aspect ratio than the first output dimensions and the second output dimension. For example, camera interface 502-3 is associated with a 1:1 aspect ratio, and camera interfaces 502-1, 502-2, and 502-4 are associated with different aspect ratios.

In some embodiments, the third camera interface includes (678) one or more controls that are not included in the first camera interface and the second camera user interface (e.g., a panorama progress indicator for aligning sequential images in a panorama). For example, camera interface 502-3 includes black-and-white control 544 that is not included in camera interfaces 502-1, 502-2, or 502-4. Camera interface 502-4 includes panorama progress indicator 550 that is not included in camera interfaces 502-1, 502-2, or 502-3.

In some embodiments, the first virtual camera, the second virtual camera and the third virtual camera use (680) a same physical camera sensor with respective sensor dimensions to produce media, the media produced by one of the virtual cameras has dimensions that are smaller than the respective sensor dimensions of the physical camera sensor (e.g., square camera or video camera), and the media produced by a different one of the virtual cameras has dimensions that are larger than the respective sensor dimensions of the physical camera sensor (e.g., panorama camera that stitches together multiple images captured by the physical camera sensor to generate a panorama image). Camera interfaces 502 use the same physical camera sensors on device 100. Camera interface 502-2 is associated with output dimensions that are smaller than the sensor dimensions. Camera interface 502-4 is associated with output dimensions that are larger than the sensor dimensions.

In some embodiments, the media produced by a different one of the virtual cameras has (682) dimensions that are the same as (or substantially the same as) the sensor dimensions of the physical camera sensor (e.g., standard still camera). Camera interface 502-1 is associated with output dimensions that are the same as the sensor dimensions.

In some embodiments, the first camera interface, the second camera interface and the third camera interface have (684) a set of one or more common controls, including a respective common control; and the respective common control is displayed in a same location on the display in the first camera interface, the second camera interface and the third camera interface. In some embodiments, the respective common control (e.g., the shutter button) has a same size and/or shape in each of the camera interfaces. In some embodiments, the respective common control has a different color or appearance in two or more different camera interfaces (e.g., the shutter button is gray or silver in a still camera user interface and red in a video camera user interface). Camera interfaces 502-1 thru 502-4 have camera roll icon 504 and shutter button 506 in common. Camera icon 504 and shutter button 506 are respectively displayed at the same respective locations across camera interfaces 502-1 thru 502-4.

In some embodiments, the first camera interface, the second camera interface, and the third camera interface include (686) a video camera interface and two different still camera interfaces (e.g., one of these three camera interfaces is a video camera interface and the two other camera interfaces are different still camera interfaces such as an oblong rectangular still camera and a panorama camera). For example, camera interface 502-1 and camera interface 502-3 (or 502-4) are still camera interfaces, and camera interface 502-2 is a video camera interface.

In some embodiments, the first camera interface, the second camera interface, and the third camera interface are selected (688) from the set consisting of: a rectangular still camera interface (e.g., an oblong rectangular still camera interface that is not square), a video camera interface, a panorama still camera interface, a black and white still camera interface, and a square still camera interface. For example, camera interfaces 502-1, 502-2, 502-3, and 502-4 are a standard camera interface (i.e., an oblong rectangular still camera interface), a video camera interface, a square still camera interface, and a panorama still camera interface, respectively.

It should be understood that the particular order in which the operations in FIGS. 6A-6G have been described is merely exemplary and is not intended to indicate that the described order is the only order in which the operations could be performed. One of ordinary skill in the art would recognize various ways to reorder the operations described herein.

Figure 7:
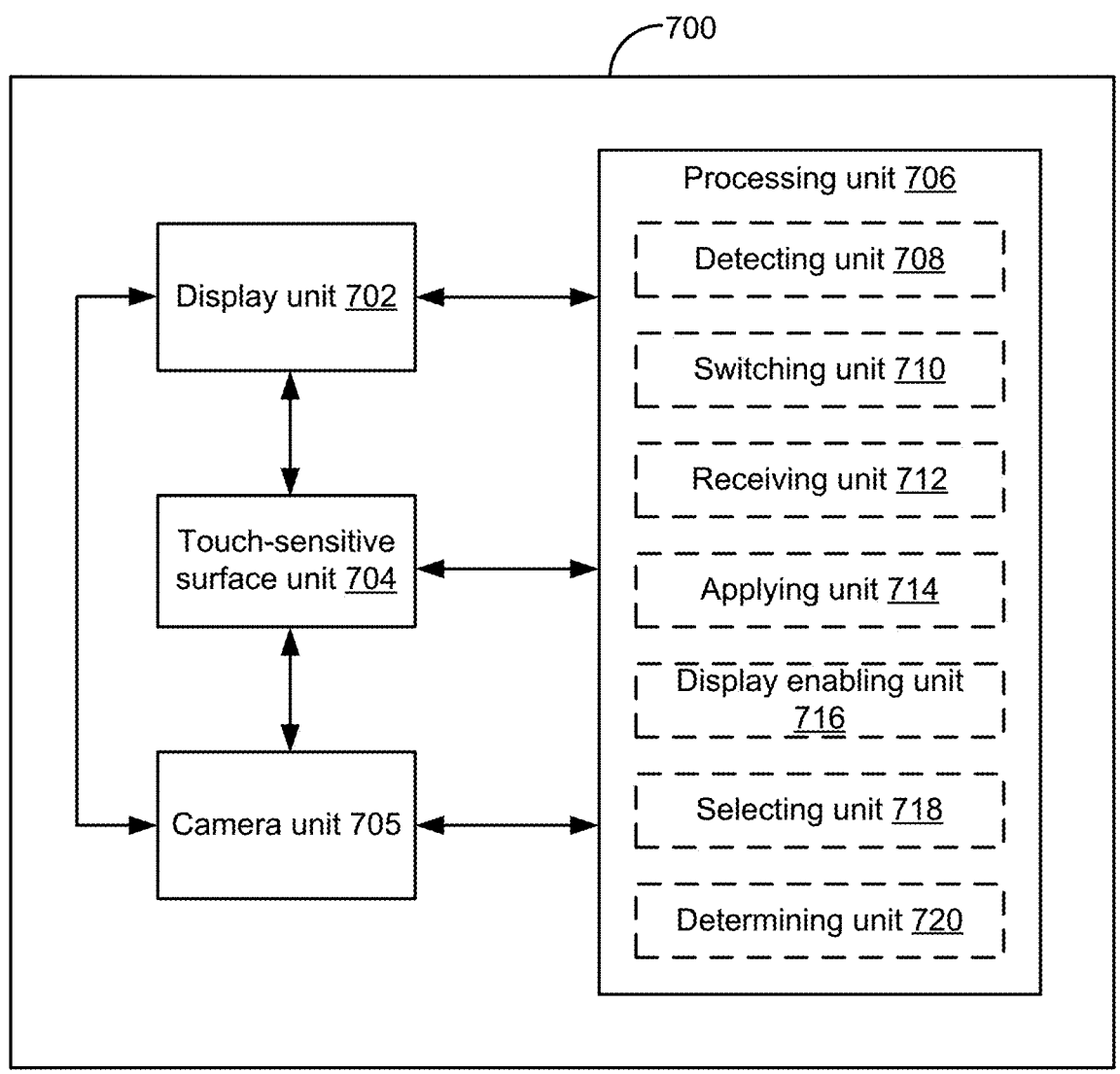
FIG. 7 is a functional block diagram of an electronic device in accordance with some embodiments.

In accordance with some embodiments, FIG. 7 shows a functional block diagram of an electronic device 700 configured in accordance with the principles of the various described embodiments. The functional blocks of the device are, optionally, implemented by hardware, software, or a combination of hardware and software to carry out the principles of the various described embodiments. It is understood by persons of skill in the art that the functional blocks described in FIG. 7 are, optionally, combined or separated into sub-blocks to implement the principles of the various described embodiments. Therefore, the description herein optionally supports any possible combination or separation or further definition of the functional blocks described herein.

As shown in FIG. 7, an electronic device 700 includes a display unit 702 configured to display a first camera interface for a first virtual camera that produces media with first output dimensions, a touch-sensitive surface unit 704 configured to receive contacts and gestures, a camera unit 705, and a processing unit 706 coupled to the display unit 702, the touch-sensitive surface unit 704, and the camera unit 705. In some embodiments, the processing unit 706 includes a detecting unit 708, a switching unit 710, a receiving unit 712, an applying unit 714, a display enabling unit 716, a selecting unit 718, and a determining unit 720.

The processing unit 706 is configured to: while enabling display of the first camera interface on the display unit 702, detect a first gesture that includes movement of a contact in a first direction on the touch-sensitive surface unit 704 (e.g., with the detecting unit 708), wherein the first gesture does not interact with a predefined camera-switching affordance; and in response to detecting the first gesture, switch from enabling display of the first camera interface to enabling display of a second camera interface for a second virtual camera that produces media with second output dimensions different from the first output dimensions (e.g., with the switching unit 710), wherein the second camera interface is different from the first camera interface.

In some embodiments, the first camera interface provides a visual indication of the first output dimensions, and the second camera interface provides a visual indication of the second output dimensions.

In some embodiments, the first output dimensions have a different aspect ratio than the second output dimensions.

In some embodiments, the first camera interface includes one or more controls that are not included in the second camera interface.

In some embodiments, the second camera interface includes one or more controls that are not included in the first camera interface.

In some embodiments, the touch-sensitive surface unit 704 is part of a touchscreen display, and the first gesture includes movement of a contact across a camera preview displayed on the touchscreen display.

In some embodiments, the touch-sensitive surface unit 704 is part of a touchscreen display, and the first gesture includes movement of a contact across a portion of the touchscreen display that does not include any displayed affordances for controlling operation of the camera unit 705.

In some embodiments, the first camera interface includes a first camera preview for displaying current visual data being detected by the camera unit 705; and the processing unit 706 is configured to: receive a request to apply a user-selected filter to media captured by the device (e.g., with the receiving unit 712); and apply the user-selected filter to visual data captured by the camera unit 705 (e.g., with the applying unit 714), so that the first camera preview includes the current visual data modified by the user-selected filter.

In some embodiments, switching from enabling display of the first camera interface to enabling display of a second camera interface includes enabling display of an animated transition between the first camera interface and the second camera interface; and the animated transition includes: enabling display of a first blurred image that corresponds to visual data recently detected by the camera unit 705, translating the first blurred image off of the display unit 702 in a respective direction, enabling display of movement of a boundary across the display unit 702 in the respective direction, and translating a second blurred image onto the display unit 702 in the respective direction, wherein the second blurred image corresponds to visual data recently detected by the camera unit 705.

In some embodiments, the touch-sensitive surface unit 704 includes a touchscreen display; a respective camera interface includes a respective camera preview for displaying current visual data detected by the camera unit 705; and the processing unit 706 is configured to: while enabling display of the respective camera interface, detect a respective input that includes a respective contact detected at a location that corresponds to the respective camera preview (e.g., with the detecting unit 708); and in response to detecting the respective input, enable display of a first magnified portion of the respective camera preview (e.g., with the display enabling unit 716) and select a point within the first magnified portion as an autofocus reference point (e.g., with the selecting unit 718).

In some embodiments, the processing unit 706 is configured to: while enabling display of the first magnified portion, detect movement of the respective contact within the camera preview (e.g., with the detecting unit 708); and in response to detecting the movement of the respective contact, enable display of a second magnified portion of the respective camera preview (e.g., with the display enabling unit 716), different from the first magnified portion, and select a point within the second magnified portion as the autofocus reference point (e.g., with the selecting unit 718).

In some embodiments, the touch-sensitive surface unit 704 includes a touchscreen display; the first camera interface includes a respective camera preview for displaying current visual data detected by the camera unit 705; and the processing unit 706 is configured to: while enabling display of the first camera interface, detect a respective input that includes a respective contact detected in the respective camera preview (e.g., with the detecting unit 708); in response to detecting the respective input: determine whether input includes movement of the respective contact by more than a predefined amount on the touchscreen display within a predefined time period (e.g., with the determining unit 720); in accordance with a determination that the respective input includes movement of the respective contact by more than the predefined amount on the touchscreen display within the predefined time period, switch from the first camera interface to a different camera interface (e.g., with the switching unit 710); and in accordance with a determination that the respective contact does not move by more than the predefined amount on the touchscreen display within a predefined time period, enable display of a magnified portion of the respective camera preview (e.g., with the display enabling unit 716) and select a point within the magnified portion as an autofocus reference point (e.g., with the selecting unit 718).

In some embodiments, the processing unit 706 is configured to: while enabling display of the second camera interface on the display unit 702, detect a second gesture on the touch-sensitive surface unit 704 (e.g., with the detecting unit 708); and in response to detecting the second gesture, in accordance with a determination that the second gesture includes movement of the contact in the first direction on the touch-sensitive surface unit 704, switch from enabling display of the second camera interface to enabling display of a third camera interface for a third virtual camera that produces media with third output dimensions different from the first output dimensions and the second output dimensions (e.g., with the switching unit 710), wherein: the third camera interface is different from the first camera interface; and the third camera interface is different from the second camera interface.

In some embodiments, the processing unit 706 is configured to, in response to detecting the second gesture, in accordance with a determination that the second gesture includes movement of the contact in a second direction on the touch-sensitive surface unit 704, different from the first direction, switch from enabling display of the second camera interface to enabling display of the first camera interface (e.g., with the switching unit 710).

In some embodiments, the touch-sensitive surface unit 704 is part of a touchscreen display, and the second gesture includes movement of a contact across a camera preview displayed on the touchscreen display.

In some embodiments, the touch-sensitive surface unit 704 is part of a touchscreen display, and the second gesture includes movement of a contact across a portion of the touchscreen display that does not include any displayed affordances for controlling operation of the camera unit 705.

In some embodiments, the third camera interface provides a visual indication of the third output dimensions.

In some embodiments, the third output dimensions have a different aspect ratio than the first output dimensions and the second output dimension.

In some embodiments, the third camera interface includes one or more controls that are not included in the first camera interface and the second camera user interface.

In some embodiments, the first virtual camera, the second virtual camera and the third virtual camera use a same physical camera sensor with respective sensor dimensions to produce media, the media produced by one of the virtual cameras has dimensions that are smaller than the respective sensor dimensions of the physical camera sensor, and the media produced by a different one of the virtual cameras has dimensions that are larger than the respective sensor dimensions of the physical camera sensor.

In some embodiments, the media produced by a different one of the virtual cameras has dimensions that are the same as the sensor dimensions of the physical camera sensor.

In some embodiments, the first camera interface, the second camera interface and the third camera interface have a set of one or more common controls, including a respective common control, and the respective common control is displayed in a same location on the display unit 702 in the first camera interface, the second camera interface and the third camera interface.

In some embodiments, the first camera interface, the second camera interface, and the third camera interface include a video camera interface and two different still camera interfaces.

In some embodiments, the first camera interface, the second camera interface, and the third camera interface are selected from the set consisting of: a rectangular still camera interface, a video camera interface, a panorama still camera interface, a black and white still camera interface, and a square still camera interface.

In some embodiments, the second camera interface includes a control for switching between camera interfaces that includes a plurality of graphical objects, including: a first graphical object that is descriptive of the first camera interface, a second graphical object that is descriptive of the second camera interface, and a third graphical object that is descriptive of the third camera interface. The processing unit 706 is configured to, in response to detecting activation of a respective graphical object in the plurality of graphical objects: in accordance with a determination that the first graphical object was activated, switch from enabling display of the second camera interface to enabling display of the first camera interface (e.g., with the switching unit 710); and in accordance with a determination that the third graphical object was activated, switch from enabling display of the second camera interface to enabling display of the third camera interface (e.g., with the switching unit 710).

In some embodiments, the processing unit 706 is configured to: while enabling display of the third camera interface on the display unit 702, detect a third gesture on the touch-sensitive surface unit 704 (e.g., with the detecting unit 708); and in response to detecting the third gesture, in accordance with a determination that the third gesture includes movement of the contact in the first direction on the touch-sensitive surface unit 704, switch from enabling display of the third camera interface to enabling display of a fourth camera interface for a fourth virtual camera that was previously selected (e.g., with the switching unit 710), based on prior inputs from the user, to be displayed in response to movement of a contact in the first direction while the third camera interface is displayed, wherein: the fourth camera interface is different from the first camera interface, the fourth camera interface is different from the second camera interface, and the fourth camera interface is different from the third camera interface.

The operations in the information processing methods described above are, optionally implemented by running one or more functional modules in information processing apparatus such as general purpose processors (e.g., as described above with respect to FIGS. 1A and 3) or application specific chips.

The operations described above with reference to FIGS. 6A-6G are, optionally, implemented by components depicted in FIGS. 1A-1B or FIG. 7. For example, detection operation 604, and switching operation 610 are, optionally, implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface (or whether rotation of the device) corresponds to a predefined event or sub-event, such as selection of an object on a user interface, or rotation of the device from one orientation to another. When a respective predefined event or sub-event is detected, event recognizer 180 activates an event handler 190 associated with the detection of the event or sub-event. Event handler 190 optionally uses or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method, comprising:
at an electronic device with one or more cameras and a touch-sensitive display:
displaying, on the touch-sensitive display, a still image camera interface, wherein the still image camera interface includes a first camera preview and a first capture affordance for capturing, with the one or more cameras, one or more still images of one or more objects in a field of view of the one or more cameras;
while displaying the still image camera interface on the touch-sensitive display, detecting a swipe input that includes movement of a contact across the first camera preview on the touch-sensitive display; and
in response to detecting the swipe input that includes movement of the contact across the first camera preview on the touch-sensitive display, replacing display of the still image camera interface that includes the first camera preview with a video camera interface, wherein the video camera interface includes a second camera preview and a second capture affordance for initiating capture, with the one or more cameras, of video content of the one or more objects in the field of view of the one or more cameras.

2. The method of claim 1, wherein the second capture affordance has a different appearance than the first capture affordance.

3. The method of claim 1, further including:
capturing video while displaying the video camera interface, using a first camera of the one or more cameras, and capturing still images while displaying the still image camera interface, using the first camera of the one or more cameras.

4. The method of claim 1, wherein:
the swipe input that includes movement of the contact across the first camera preview on the touch-sensitive display comprises a first input that includes a swipe in a first direction; and
the method includes,
while displaying the still image camera interface, detecting a second input on the touch-sensitive display that includes a swipe in a second direction, different from the first direction; and
in response to detecting the second input on the touch-sensitive display, replacing display of the still image camera interface with a third camera interface distinct from the still image camera interface and the video camera interface, wherein the third camera interface includes the first capture affordance for capturing photos, comprising still images, with the one or more cameras.

5. The method of claim 4, including:
while displaying the video camera interface, detecting a third input on the touch-sensitive display that includes a swipe in the second direction; and
in response to detecting the third input on the touch-sensitive display, replacing display of the video camera interface with the still image camera interface.

6. The method of claim 1, including, in response to detecting the swipe input on the touch-sensitive display, shifting a portion of the still image camera interface in a direction of movement of the contact.

7. The method of claim 1, including:
while displaying, on the touch-sensitive display, the still image camera interface, displaying a captured media viewing affordance;
while replacing display of the still image camera interface with the video camera interface, maintain display of the captured media viewing affordance;
detecting an input selecting the captured media viewing affordance; and
in response to detecting the input selecting the captured media viewing affordance, displaying a captured media viewing interface that includes representations of a plurality of captured media items.

8. A non-transitory computer readable storage medium storing one or more programs, the one or more programs comprising instructions, which when executed by an electronic device with a touch-sensitive display and one or more cameras, cause the electronic device to perform:
displaying, on the touch-sensitive display, a still image camera interface, wherein the still image camera interface includes a first camera preview and a first capture affordance for capturing, with the one or more cameras, one or more still images of one or more objects in a field of view of the one or more cameras;
while displaying the still image camera interface on the touch-sensitive display, detecting a swipe input that includes movement of a contact across the first camera preview on the touch-sensitive display; and
in response to detecting the swipe input that includes movement of the contact across the first camera preview on the touch-sensitive display, replacing display of the still image camera interface that includes the first camera preview with a video camera interface, wherein the video camera interface includes a second camera preview and a second capture affordance for initiating capture, with the one or more cameras, of video content of the one or more objects in the field of view of the one or more cameras.

9. The non-transitory computer readable storage medium of claim 8, wherein the second capture affordance has a different appearance than the first capture affordance.

10. The non-transitory computer readable storage medium of claim 8, wherein the one or more programs further comprise instructions that cause the electronic device to perform:
capturing video while displaying the video camera interface, using a first camera of the one or more cameras, and capturing still images while displaying the still image camera interface, using the first camera of the one or more cameras.

11. The non-transitory computer readable storage medium of claim 8, wherein:

the swipe input that includes movement of the contact across the first camera preview on the touch-sensitive display comprises a first input that includes a swipe in a first direction; and the one or more programs include instructions, which when executed by the electronic device, cause the electronic device to perform:

while displaying the still image camera interface, detecting a second input on the touch-sensitive display that includes a swipe in a second direction, different from the first direction; and in response to detecting the second input on the touch-sensitive display, replacing display of the still image camera interface with a third camera interface distinct from the still image camera interface and the video camera interface, wherein the third camera interface includes the first capture affordance for capturing photos, comprising still images, with the one or more cameras.

12. The non-transitory computer readable storage medium of claim 11, wherein the one or more programs include instructions, which when executed by the electronic device, cause the electronic device to perform:

while displaying the video camera interface, detecting a third input on the touch-sensitive display that includes a swipe in the second direction; and in response to detecting the third input on the touch-sensitive display, replacing display of the video camera interface with the still image camera interface.

13. The non-transitory computer readable storage medium of claim 8, wherein the one or more programs include instructions, which when executed by the electronic device, cause the electronic device to perform: in response to detecting the swipe input on the touch-sensitive display, shifting a portion of the still image camera interface in a direction of movement of the contact.

14. The non-transitory computer readable storage medium of claim 8, wherein the one or more programs include instructions, which when executed by the electronic device, cause the electronic device to perform:

while displaying, on the touch-sensitive display, the still image camera interface, displaying a captured media viewing affordance;

while replacing display of the still image camera interface with the video camera interface, maintain display of the captured media viewing affordance;

detecting an input selecting the captured media viewing affordance; and in response to detecting the input selecting the captured media viewing affordance, displaying a captured media viewing interface that includes representations of a plurality of captured media items.

15. An electronic device, comprising:
a touch-sensitive display;
one or more cameras;
one or more processors;
memory; and
one or more programs, wherein the one or more programs are stored in the memory and configured to be executed by the one or more processors, the one or more programs including instructions for:

displaying, on the touch-sensitive display, a still image camera interface, wherein the still image camera interface includes a first camera preview and a first capture affordance for capturing, with the one or more cameras, one or more still images of one or more objects in a field of view of the one or more cameras;

while displaying the still image camera interface on the touch-sensitive display, detecting a swipe input that includes movement of a contact across the first camera preview on the touch-sensitive display; and in response to detecting the swipe input that includes movement of the contact across the first camera preview on the touch-sensitive display, replacing display of the still image camera interface that includes the first camera preview with a video camera interface, wherein the video camera interface includes a second camera preview and a second capture affordance for initiating capture, with the one or more cameras, of video content of the one or more objects in the field of view of the one or more cameras.

16. The electronic device of claim 15, wherein the second capture affordance has a different appearance than the first capture affordance.

17. The electronic device of claim 15, wherein the one or more programs further include instructions for:

capturing video while displaying the video camera interface, using a first camera of the one or more cameras, and capturing still images while displaying the still image camera interface, using the first camera of the one or more cameras.

18. The electronic device of claim 15, wherein:
the swipe input that includes movement of the contact across the first camera preview on the touch-sensitive display comprises a first input that includes a swipe in a first direction; and the one or more programs include instructions for:
while displaying the still image camera interface, detecting a second input on the touch-sensitive display that includes a swipe in a second direction, different from the first direction; and in response to detecting the second input on the touch-sensitive display, replacing display of the still image camera interface with a third camera interface distinct from the still image camera interface and the video camera interface, wherein the third camera interface includes the first capture affordance for capturing photos, comprising still images, with the one or more cameras.

19. The electronic device of claim 18, wherein the one or more programs include instructions for:

while displaying the video camera interface, detecting a third input on the touch-sensitive display that includes a swipe in the second direction; and in response to detecting the third input on the touch-sensitive display, replacing display of the video camera interface with the still image camera interface.

20. The electronic device of claim 15, wherein the one or more programs include instructions for: in response to detecting the swipe input on the touch-sensitive display, shifting a portion of the still image camera interface in a direction of movement of the contact.

21. The electronic device of claim 15, wherein the one or more programs include instructions for:

while displaying, on the touch-sensitive display, the still image camera interface, displaying a captured media viewing affordance;

while replacing display of the still image camera interface with the video camera interface, maintaining display of the captured media viewing affordance;

detecting an input selecting the captured media viewing affordance; and in response to detecting the input selecting the captured media viewing affordance, displaying a captured media viewing interface that includes representations of a plurality of captured media items.

22. The method of claim 1, wherein:
a media capture input initiated from the still image camera interface causes the electronic device to capture still images with first output dimensions;
a media capture input initiated from the video camera interface causes the electronic device to capture video with second output dimensions; and
the first output dimensions have a different aspect ratio than the second output dimensions.

23. The method of claim 1, wherein the swipe input that includes movement of the contact across the first camera preview on the touch-sensitive display is a single finger contact that moves across the first camera preview on the touch-sensitive display.

24. The method of claim 23, wherein the single finger contact moves in a direction substantially parallel with a bottom edge of the touch-sensitive display, and replacing display of the still image camera interface with the video camera interface is in response to detecting the single finger contact moving in a direction substantially parallel with a bottom edge of the touch-sensitive display.

25. The method of claim 23, wherein the single finger contact moves in a direction moving away from a right side of the touch-sensitive display toward a left side of the touch-sensitive display, or a direction moving away from the left side of the touch-sensitive display toward the right side of the touch-sensitive display.

26. The method of claim 1, including, while displaying the still image camera interface, displaying a camera control affordance for toggling between activating a back-facing camera on the electronic device and activating a front-facing camera on the electronic device.

27. The non-transitory computer readable storage medium of claim 8, wherein:
a media capture input initiated from the still image camera interface causes the electronic device to capture still images with first output dimensions;
a media capture input initiated from the video camera interface causes the electronic device to capture video with second output dimensions; and
the first output dimensions have a different aspect ratio than the second output dimensions.

28. The non-transitory computer readable storage medium of claim 8, wherein the swipe input that includes movement of the contact across the first camera preview on the touch-sensitive display is a single finger contact that moves across the first camera preview on the touch-sensitive display.

29. The non-transitory computer readable storage medium of claim 28, wherein the single finger contact moves in a direction substantially parallel with a bottom edge of the touch-sensitive display, and replacing display of the still image camera interface with the video camera interface is in response to detecting the single finger contact moving in a direction substantially parallel with a bottom edge of the touch-sensitive display.

30. The non-transitory computer readable storage medium of claim 28, wherein the single finger contact moves in a direction moving away from a right side of the touch-sensitive display toward a left side of the touch-sensitive display, or a direction moving away from the left side of the touch-sensitive display toward the right side of the touch-sensitive display.

31. The non-transitory computer readable storage medium of claim 8, wherein the one or more programs include instructions, which when executed by the electronic device, cause the electronic device to perform: while displaying the still image camera interface, displaying a camera control affordance for toggling between activating a back-facing camera on the electronic device and activating a front-facing camera on the electronic device.

32. The electronic device of claim 15, wherein:
a media capture input initiated from the still image camera interface causes the electronic device to capture still images with first output dimensions;
a media capture input initiated from the video camera interface causes the electronic device to capture video with second output dimensions; and
the first output dimensions have a different aspect ratio than the second output dimensions.

33. The electronic device of claim 15, wherein the swipe input that includes movement of the contact across the first camera preview on the touch-sensitive display is a single finger contact that moves across the first camera preview on the touch-sensitive display.

34. The electronic device of claim 33, wherein the single finger contact moves in a direction substantially parallel with a bottom edge of the touch-sensitive display, and replacing display of the still image camera interface with the video camera interface is in response to detecting the single finger contact moving in a direction substantially parallel with a bottom edge of the touch-sensitive display.

35. The electronic device of claim 33, wherein the single finger contact moves in a direction moving away from a right side of the touch-sensitive display toward a left side of the touch-sensitive display, or a direction moving away from the left side of the touch-sensitive display toward the right side of the touch-sensitive display.

36. The electronic device of claim 15, wherein the one or more programs further include instructions for: while displaying the still image camera interface, displaying a camera control affordance for toggling between activating a back-facing camera on the electronic device and activating a front-facing camera on the electronic device.

* * * * *